(12) United States Patent
Wyner et al.

(10) Patent No.: US 7,448,676 B2
(45) Date of Patent: Nov. 11, 2008

(54) DYNAMIC SEAT WITH INFLATABLE BLADDER

(75) Inventors: Daniel M. Wyner, North Scituate, RI (US); Thomas F. Cafaro, Foster, RI (US); Jeffrey H. Bowie, Chepachet, RI (US)

(73) Assignee: poly Polyworks, Inc., Lincoln, RI (US)

( * ) Notice: Subject to any disclaimer, the term of this patent is extended or adjusted under 35 U.S.C. 154(b) by 0 days.

(21) Appl. No.: 11/615,141

(22) Filed: Dec. 22, 2006

(65) Prior Publication Data

US 2007/0145795 A1 Jun. 28, 2007

Related U.S. Application Data

(60) Provisional application No. 60/753,872, filed on Dec. 23, 2005, provisional application No. 60/745,800, filed on Apr. 27, 2006.

(51) Int. Cl.
*B62J 1/26* (2006.01)
(52) U.S. Cl. ........................ 297/200; 297/199
(58) Field of Classification Search ............... 297/199, 297/200
See application file for complete search history.

(56) References Cited

U.S. PATENT DOCUMENTS

| | | | |
|---|---|---|---|
| 1,625,582 A * | 4/1927 | Anderson | 428/178 |
| 4,429,915 A | 2/1984 | Flager | |
| 4,611,851 A | 9/1986 | Noyes et al. | |
| 4,952,439 A * | 8/1990 | Hanson | 428/72 |
| 5,108,076 A | 4/1992 | Chiarella | |
| 5,143,390 A * | 9/1992 | Goldsmith | 280/201 |
| 5,203,607 A | 4/1993 | Landi | |
| 5,280,993 A * | 1/1994 | Hsh | 297/199 |
| 5,318,344 A * | 6/1994 | Wang | 297/199 |
| 5,330,249 A * | 7/1994 | Weber et al. | 297/214 |
| 5,335,382 A * | 8/1994 | Huang | 5/655.3 |
| 5,419,612 A * | 5/1995 | Rassekhi | 297/200 |
| 5,634,685 A * | 6/1997 | Herring | 297/219.11 |
| 5,846,063 A * | 12/1998 | Lakic | 417/440 |
| 5,938,277 A | 8/1999 | Rioux et al. | |
| 5,975,629 A * | 11/1999 | Lorbiecki | 297/200 |
| 6,012,772 A * | 1/2000 | Conde et al. | 297/219.11 |
| 6,135,550 A | 10/2000 | Tucho | |
| 6,153,277 A * | 11/2000 | Chang | 428/35.2 |
| 6,305,743 B1 * | 10/2001 | Wheeler | 297/199 |
| 6,390,548 B1 | 5/2002 | Cole | |
| 7,114,783 B2 * | 10/2006 | Warren et al. | 297/452.41 |

* cited by examiner

*Primary Examiner*—David R Dunn
*Assistant Examiner*—Tania Abraham
(74) *Attorney, Agent, or Firm*—Barlow, Josephs & Holmes, Ltd.

(57) ABSTRACT

A novel and unique bicycle seat for a rider includes a base having a base top surface with an inflatable bladder having a bladder top surface. The inflatable bladder is disposed on the base top surface and the base top surface and the bladder top surface together form a seat contour profile. A pump is connected to the inflatable bladder to introduce fluid media therein with a release valve fluidly connected to the bladder to permit fluid media to exit therefrom. Also, the bicycle seat of the present invention can be configured to be in the form of a cover to be retrofitted to an existing bicycle seat. In this configuration, the cover includes a base with a structure for securing it to the existing bicycle seat. For example, this structure can be a skirt of material or other releasable type of structure.

62 Claims, 19 Drawing Sheets

DYNAMIC SEAT WITH INFLATABLE BLADDER

CROSS-REFERENCE TO RELATED APPLICATIONS

This application is related to and claims priority from earlier filed provisional patent applications Ser. No. 60/753,872, filed Dec. 23, 2005 and Ser. No. 60/745,800, filed Apr. 27, 2006.

BACKGROUND OF THE INVENTION

This invention generally relates to a new and unique seat and seat cover containing an adjustable air bladder system. More specifically, the present invention relates to a bicycle seat and seat cover that includes an adjustable air bladder system that at least includes an integrated pumping mechanism that allows the seat to be adjusted before riding or during a ride; an air bladder with a contoured profile shape designed to lift the rider in selective areas so as to relieve pressure on other sensitive areas and simply to alter the contact points of the rider to the seat. Over time, any contact points may begin to be painful; an air bladder beneath a layer of gel or molded gel, or encapsulated within gel or any other cushioning material.

There have been attempts in the prior art to make seats as light and comfortable as possible. This is particularly true with bicycle seats due to the nature and use of these types of seats. The prior art includes numerous attempts to make a bicycle seat that is both very light as well as very comfortable. The comfort of the seat is both a function of its shape and of the materials of which it is made. Often there can be conflict between adding shock absorbing materials such as gels and reducing the seat weight. The lightest seats tend to offer the rider much less cushioning. Also, many times a seat that is very comfortable for a shorter ride becomes quite uncomfortable for a much longer ride due to long term pressure on the same contact points between the seat and rider. In general, there is a balance between the cushioning of a bicycle seat and its performance. If a bicycle seat has too much cushion, performance, such as for racing and touring, suffers because a) the seat is generally very heavy and; b) the seat can absorb energy from the rider bouncing; c) the seat is not as sleek in configuration and can restrict movement required for competitive pedaling motion and can also cause chaffing and; and d) a seat that has too much cushion make the rider bounce too much and makes it more difficult for to control the bicycle this is of critical importance during racing, for example. In addition, there is an aesthetic issue where if the seat does not look sleek the riders will not want it on their bicycle.

More specifically, most conventional bicycle saddles provide a low degree of comfort, especially for the novice or occasional bicycle rider who assumes an upright position. These conventional bicycle saddles generally are rigid in order to provide the necessary support, and are narrowed towards the front, to accommodate the upward and downward pumping action of the legs and to minimize friction between the legs and saddle, producing a hard, narrow ridge upon which a portion of the rider's weight usually rests. Saddles designed for racing or touring are particularly hard and narrow. Although these saddles typically are used in conjunction with drop handle bars in which the weight of the cyclist is shifted toward, much of the weight of the cyclist still rests on the saddle and is focused on relatively small contact points. Soreness often results, especially for the novice bicyclist and even for the experienced bicyclist after long periods of riding. This is due to the long term focused pressure on the same small contact points. This soreness is often aggravated by poor road maintenance, the nearly vertical orientation of the saddle post and rough condition on poorly paved, cobbled, or brick roads.

Nonracing bicycles are often provided with wide, soft saddles having coil springs. These saddles are comfortable for novices and for short journeys, because of the greater weight of the saddle, and because of the width of the saddle which causes painful friction with the thighs, such saddles are unsuitable for racing conditions and for long journeys. Much of the support is provided by the edges and the forward, narrower portion of the seat where the cushioning effect of the springs is least. Springs of these saddles are prone to corrosion which is enhanced by the water-absorbing nature of the upholstery. Most bicycle saddles currently available for the general public are a compromise between the hard racing saddles and the wider spring cushion saddles previously described and have many of the problems associated with each.

Thus, there have been many attempts to address comfort in the higher performance racing seats without reducing the performance thereof. For example, much of the prior art involves novel methods of using low durometer gels and foamed plastics. These materials are used in countless designs and methods. By way of example, U.S. Pat. No. 5,203,607, issued to Landi, discloses an ergonomic bicycle seat having a first layer of conventional foam padding and a second layer of thermoplastic elastomeric honeycomb padding. U.S. Pat. No. 5,108,076, issued to Chiarella, discloses an anatomical multilayer bicycle seat including an encapsulated gel layer. Further, U.S. Pat. No. 4,429,915, issued to Flager, describes a bicycle seat which distributes the weight of the rider.

The prior art also has shown a number of attempts to utilize an inflatable air chamber as a means of cushioning the rider from shock. An air chamber has the advantage of providing a high degree of cushioning with a low amount of add-on weight to the bicycle. In addition, an inflatable air chamber allows the rider to adjust the firmness of the seat to their personal taste. For example, U.S. Pat. No. 6,390,548, issued to Cole, discloses a design for a bicycle seat with an inflatable interior for protecting the genital area of the bicyclist. U.S. Pat. No. 5,938,277, issued to Rioux, describes an air bladder assembly that can be added to the top of an existing seat construction.

Therefore, there is a need for a seat, for use on a bicycle, that provides for the adjustable comfort of an air bladder, and allows for the shape and firmness of the seat to be customized and altered during the ride. There is also a need for such a seat to be light in weight and sleek and suitable for high performance use, and yet still be comfortable and adjustable to suit the rider over long periods of riding.

SUMMARY OF THE INVENTION

The present invention preserves the advantages of prior art bicycle cushioned seats. In addition, it provides new advantages not found in currently available cushioned bicycle seats and overcomes many disadvantages of such currently available seats.

The invention is generally directed to the novel and unique bicycle seat for a rider that includes a base having a base top surface with an inflatable bladder having a bladder top surface. The inflatable bladder is disposed on the base top surface and the base top surface and the bladder top surface together form a seat contour profile. A pump is connected to the inflatable bladder to introduce fluid media therein with a release valve fluidly connected to the bladder to permit fluid media to exit there from. Also, the bicycle seat of the present invention can be configured to be in the form of a cover to be retrofitted to an existing bicycle seat. In this configuration, the cover includes a base with a structure for securing it to the existing bicycle seat. For example, this structure can be a skirt of material or other releasable type of structure. Also, it is envisioned that the bladder may be affixed directly to the top of an existing bicycle seat to retrofit an inflatable bladder thereto. For example, the bladder may be attached to the top of the seat, such as with a peel and stick adhesive. In such cases where the bladder is affixed to the top of an existing bicycle seat, such bladder may also be encased within gel or beneath a layer of gel, and may be further optionally covered by a stretchable cover surface.

The present invention is designed to lift the rider with air in select areas, so as to relieve pressure and also change the contact points. Prior art is using air in a chamber to adjust firmness and provide "better" cushioning to the sensitive areas but is not designed to alter or change the contact points. The invention in the Cole patent clearly describes a chamber with an hour glass shape designed to fill an empty space in the seat and to have the air cushion the sensitive areas and not to lift the rider or change the profile. The invention in the Rioux patent is also not selective profile changing in shape, but is described to have a "vertical cross-section with a uniform height between the top and the bottom thereof".

The present invention is designed to be a comfortable sleek seat that can be ridden as a normal seat when the bladder is fully empty. The bladder is flat and takes up almost no space when fully empty. The pump mechanism is intimately connected within the overall confines of the flat welded bladder sheet, thus the connection with the pump is also "flat". The result is that bladder configuration of the present invention can be installed on a seat that will function as a standard "sleek" saddle when completely uninflated, and neither the bladder nor the pump connection changes this seat profile while in an uninflated state. When inflated, the seat profile and contact points are adjusted. With the present invention, a saddle is provided that meets the functional and aesthetic basics of an acceptable saddle when uninflated, and the air adjustments are an added option. If this is not the case, then a failure of the air bladder means that the remainder of the ride will not be as comfortable. This is not going to be acceptable, so it is important that the seat is normally comfortable with an uninflated bladder, and the rider is really no worse off than if they had no air adjust feature to begin with. Other air seat attempts in the prior art have bladders that have sidewalls and thus are still three dimensional shapes when uninflated. Most of these bladders are made from rubber products, and are designed to fill a chamber or empty space in the saddle. With these non-flat bladders, the resultant bike seat cannot be as sleek, since there is space needed for these air chambers. Furthermore, when the chamber is fully empty, the seat is not rideable, as its shape will be unacceptable or uncomfortable, and will sag into the evacuated chamber or not have sufficient cushioning. They are designed to be ridden with some inflation level to provide the basic comfort to the seat, and in some cases couldn't even be fully evacuated due to the shape of the walls. In the event of an air chamber failure, these prior art saddles would be uncomfortable to ride.

The integrated pump of the present invention is preferably intimately connected to the film of the bladder itself. Other attachment methods will take away from the sleekness of the seat and its visual appeal. Also, having the pump as part of the bladder, means the attachment is also flat when uninflated, and thus the seat has no bump that might be caused by the attachment of a round tube or fitting. Since the seat of the present invention is designed to be a normal rideable seat when fully uninflated, the flatness of the entire bladder and pump mechanism is important. The integrated pump will also be more reliable, as it has no coupling point that could fail. When an electric pump is integrated into the present invention, it is not possible to avoid a coupling to the external device, and care has to be given to make sure the coupling is as secure and unobtrusive as possible.

The convenience of the pumping mechanisms described in the present invention are better for dynamic adjustment than the systems employed in the prior art. An extended air tube with bulb is more cumbersome and could not be easily hidden in a sleek racing saddle. It also adds weight. The construction of the present invention allows easy dynamic adjustment with minimal weight and also does not impair the aesthetics of the sleek saddle. The pump mechanism of the present invention is an important part of being able to create a dynamically adjustable saddle which can still be almost exactly as flat and sleek as the best racing saddles in the market.

The seats of the prior art are not well-suited for high performance riding. The prior art bicycle seats with air bladders typically involve the use of external pumping mechanisms to inflate or deflate the bladder and thus are not designed for dynamic use while riding. For example, U.S. Pat. No. 6,390,548, teaches an inflatable cushion with an air tube extending outwardly therefrom and extending outwardly of the bicycle seat with a free end of the air tube having a hand pump coupled thereto for selectively pumping air into the cushion. Other prior art seats have similar external pumping mechanisms. However, none of the prior art describes an inflatable seat cushion with an integrated pumping mechanism to solve the problem of ease of use during a performance ride, such as racing.

Most notably, the prior art fails to provide a seat with an air bladder lifts the rider from the seat in selected areas so as to reduce pressure on other sensitive areas. Because a bike rider is in a dynamic situation on a ride, a seat configuration or firmness that feels comfortable initially may no longer feel comfortable after many minutes or hours of riding. The rider often finds it desirable or necessary to shift his or her position on the seat during the ride to vary the seat contact points with the body. Often, a rider will lift from the saddle for periods of time for the same reasons.

It is therefore an object of the present invention to provide a bicycle seat that provides for the adjustable comfort of an air bladder.

There is a further object of the present invention to provide a bicycle seat that allows for the shape and firmness of the seat to be customized and altered during a ride by the user to permit lift or support in selected areas to change the contact points to relieve pressure on others.

There is also an object of the present invention to provide a bicycle seat that is light in weight yet still is comfortable, adjustable and suitable for high performance use.

There is yet a further object of the present invention to provide a bicycle seat that is of a high performance saddle configuration yet is still capable of providing different profile contours of the seat without sacrificing the high performance characteristics of the seat.

There is yet a further object of the present invention to provide a bicycle seat that is fully functional when deflated and when inflated changes its contour or profile.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

The present invention provides for a new and unique seat 10 that is light in weight yet is comfortable and adjustable. The seat 10 of the present invention can be used in any type of environment where such a seat 10 is required. There is particular application of the seat 10 of the present invention for use in on a bicycle (not shown) due to the requirements of such an environment. The present invention is not limited to such a bicycle application and it is intended that other seats and other environments are within the scope of the present invention. Therefore, by way of example and for ease of discussion and illustration, a bicycle seat 10 construction will be addressed herein. The present invention can utilize standard bicycle seat construction for its base and stem and could utilize any of the materials conceived of in the prior art for the basic construction. Since the interconnection of seat to bicycles are so well know, this interconnection need not be shown herein.

Figure 1:
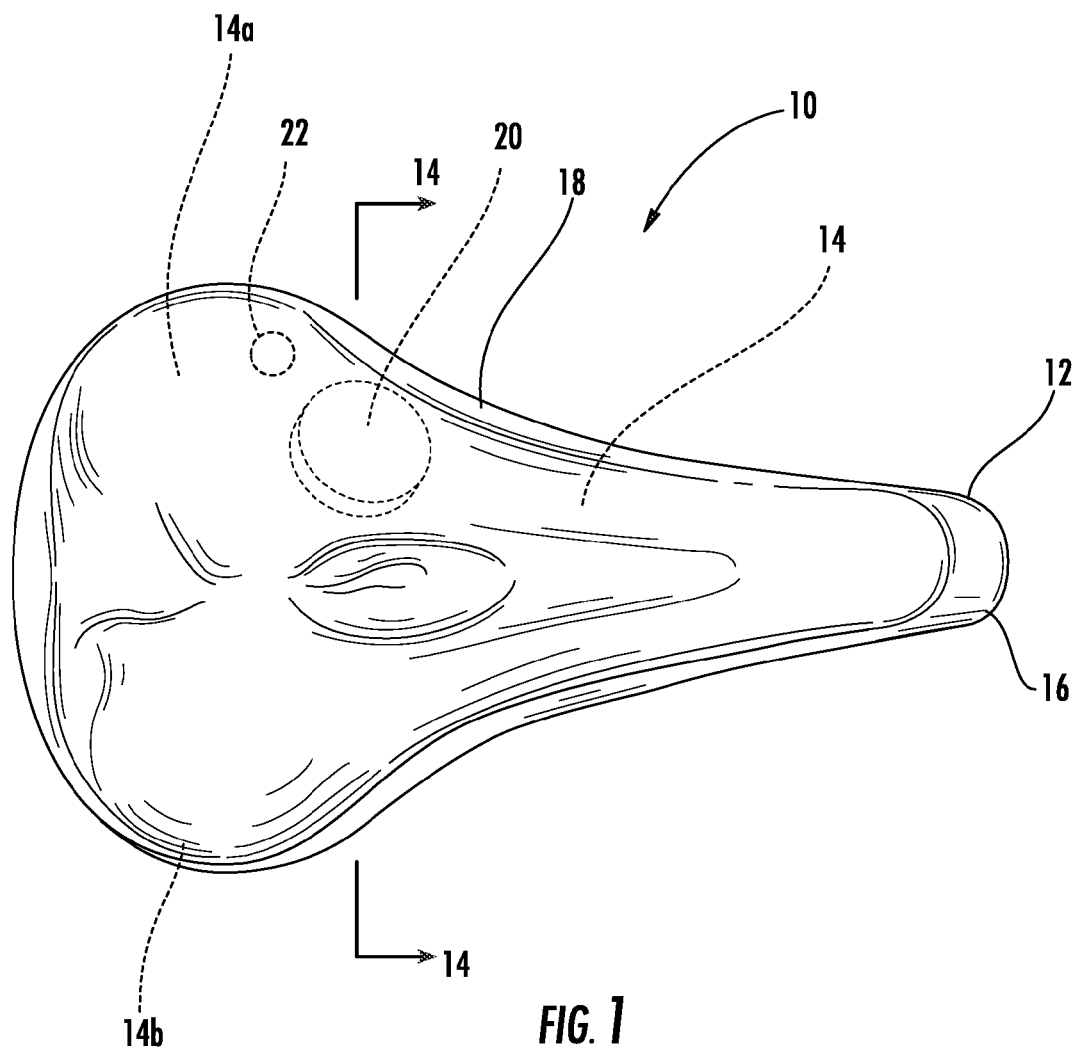
FIG. 1 is a top view of the bicycle seat of the present invention in an uninflated condition.
Figure 2:
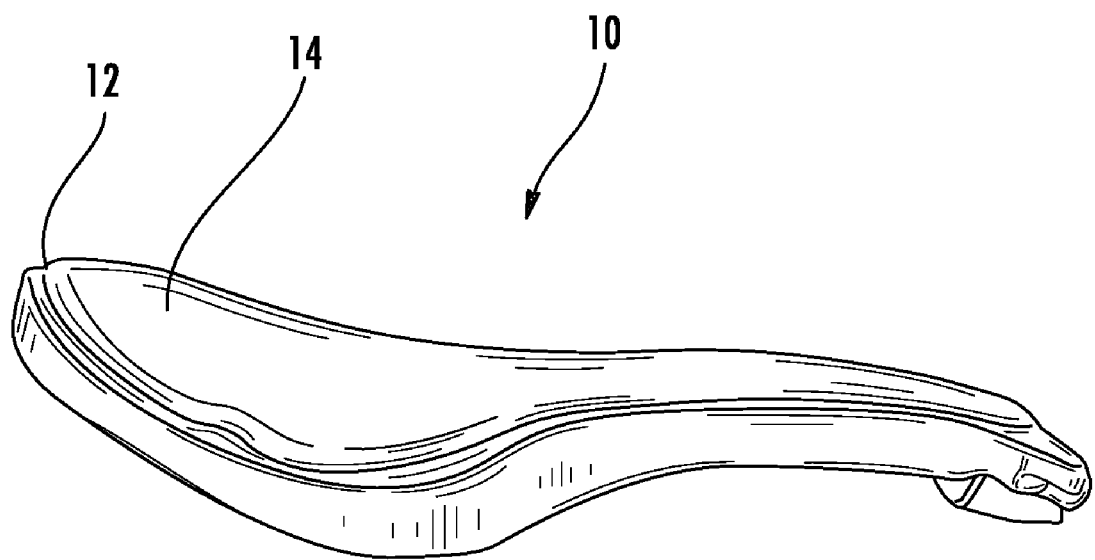
FIG. 2 is a side elevational view of the bicycle seat of FIG. 1.

Referring first to FIG. 1., a top perspective view of the bicycle seat 10 of the present invention is shown in detail in an uninflated condition while FIG. 2 shows an elevational view of the seat in the same uninflated condition. The bicycle seat includes a base 12, which is preferably in the form of a racing style "horse saddle" configuration. While this configuration is preferred, the seat 10 may employ any type of configuration. The bicycle seat 10 uniquely includes an integrated fluid bladder 14 that preferably resides directly on the top surface 16 of the base 12. The bladder 14 is preferably filled with air for ease of use.

A layer of cushioning material 18 is provided over the top of the bladder 14 to not only provide a impact and shock absorption for the rider but also to secure the bladder 14 into place. As will be described in detail below, the cushioning material 18 is preferably a gel material that is over molded over the bladder 14. In FIGS. 1 and 2, the cushioning gel 18 and bladder 14 are transparent for ease of illustration and explanation but these components may be of any color. Cross-sectional views in FIGS. 14-16, discussed below, show additional details of this construction.

Figure 5:
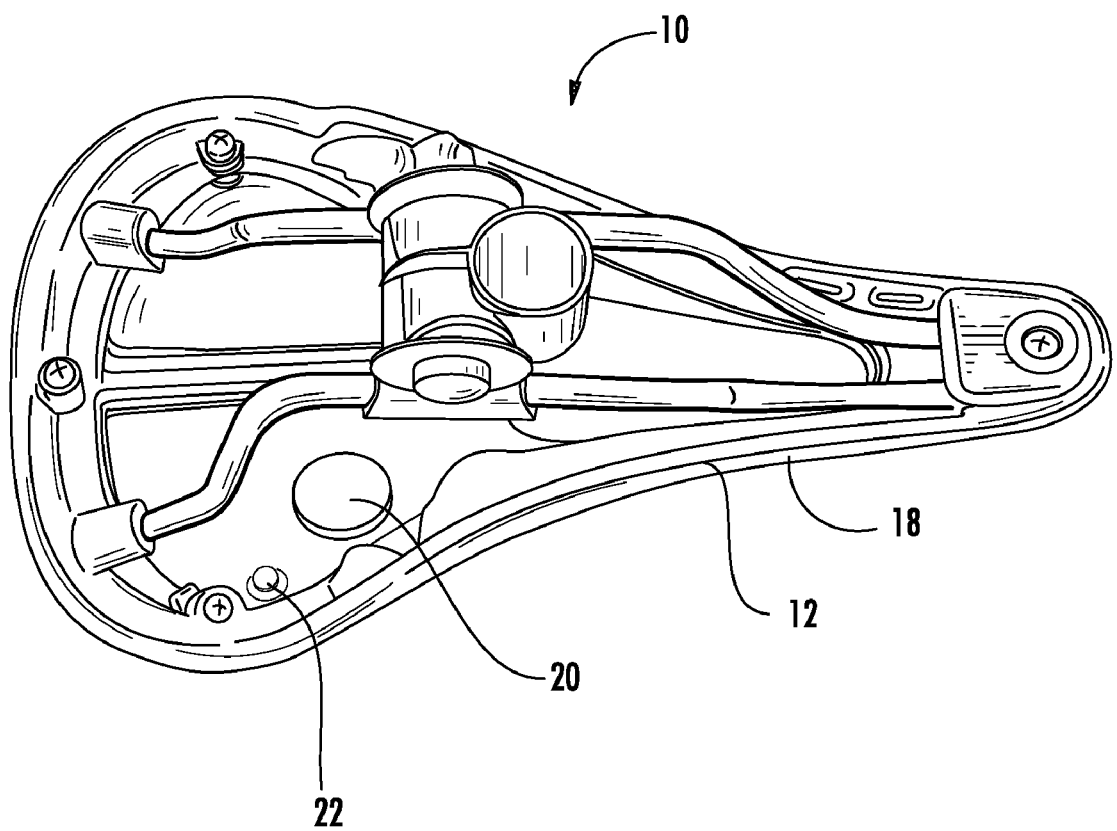
FIG. 5 is a bottom view of the bicycle seat of FIG. 1 showing the pump and release mechanism.
Figure 6:
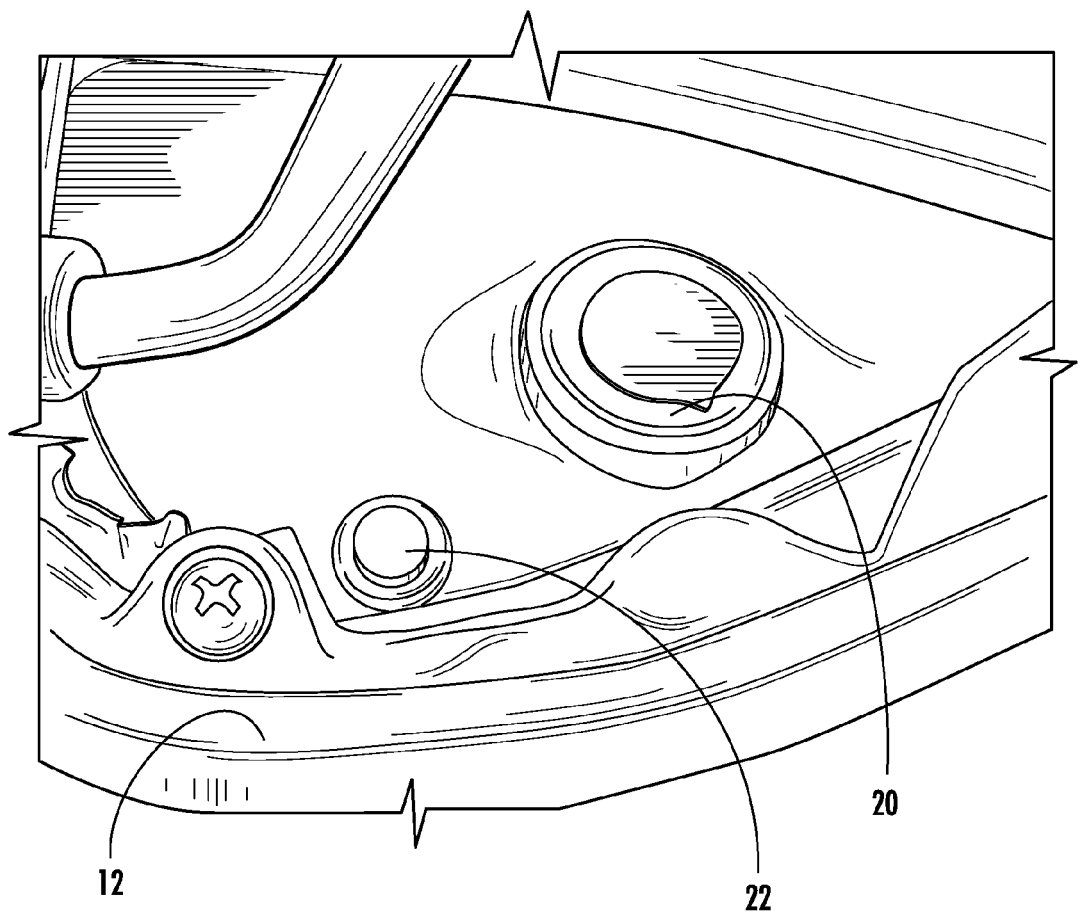
FIG. 6 is a close-up perspective view of the pump and release mechanism of FIG. 5.

As can be seen in FIG. 1, an integrated pumping mechanism 20 and release valve 22 in provided in fluid communication with the bladder. FIG. 5 illustrates a bottom view of the bicycle seat 10 of the present invention showing an example positioning of the integrated pumping mechanism 20. This pumping mechanism 20 can be seen through the bladder 14 and cushioning layer 18 in FIG. 1. A close-up view of the preferred pumping mechanism and release valve is shown in FIG. 6.

The integrated pumping mechanism 20 is preferably in the configuration of a dome pump with an air release valve 22 located proximal thereto for ease of access. As seen in FIGS.

5 and 6, the pump 20 and air release valve 22 are preferably located underneath the seat 10, however, they may be alternatively located anywhere on the seat 10, such as on its side, under the front tip of the seat 10, or in any other area allowing the rider easy access and one-handed operation. The pump mechanism 20 shown in FIGS. 1, 5 and 6 can employ any type of pump mechanism but preferably employs a dome style pump and check valve technology manufactured by Dielectrics Inc of Chicopee, Mass. The dome pump 20 and release valve 22 are in fluid communication with the air bladder 14 disposed on the base 12 of the seat 20 and underneath the cushioning layer 18. As will be discussed below, the bladder 18 is preferably constructed of film layers which are welded together.

Figure 3:
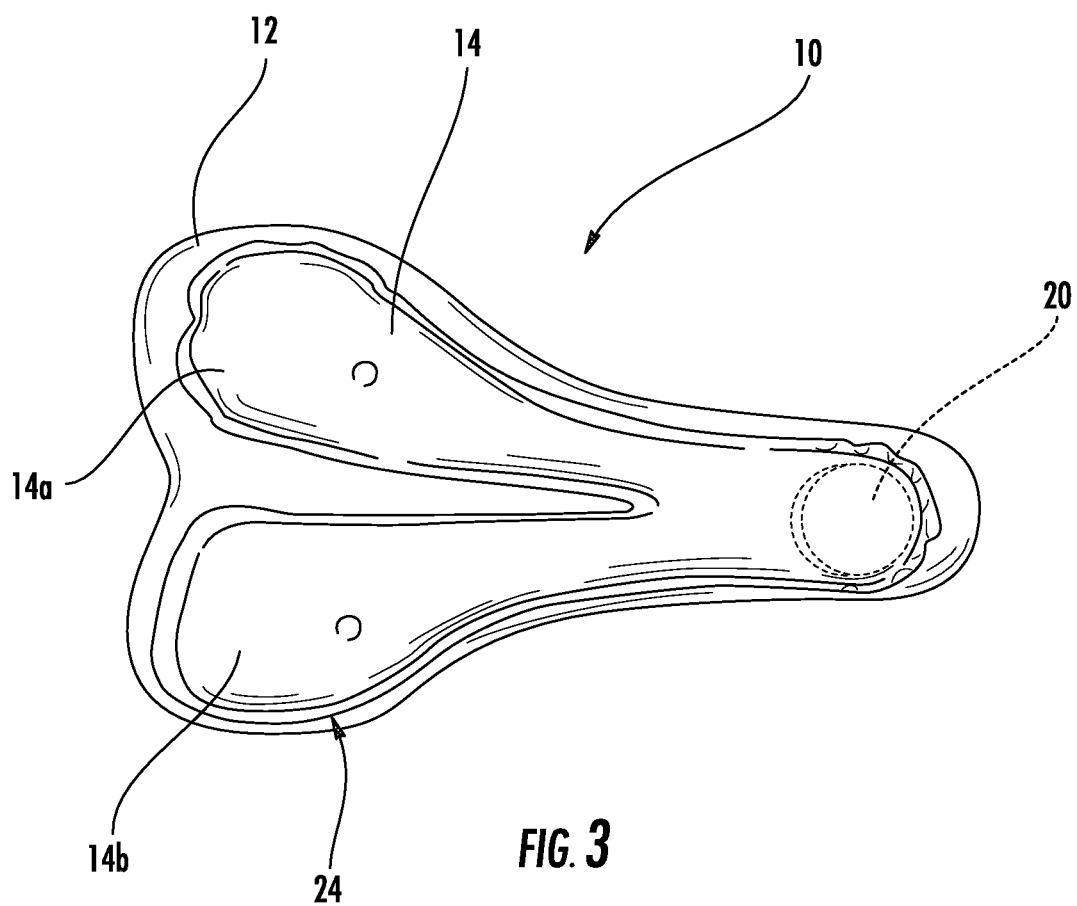
FIG. 3 is a top view of the bicycle seat of the present invention in an inflated condition.
Figure 4:
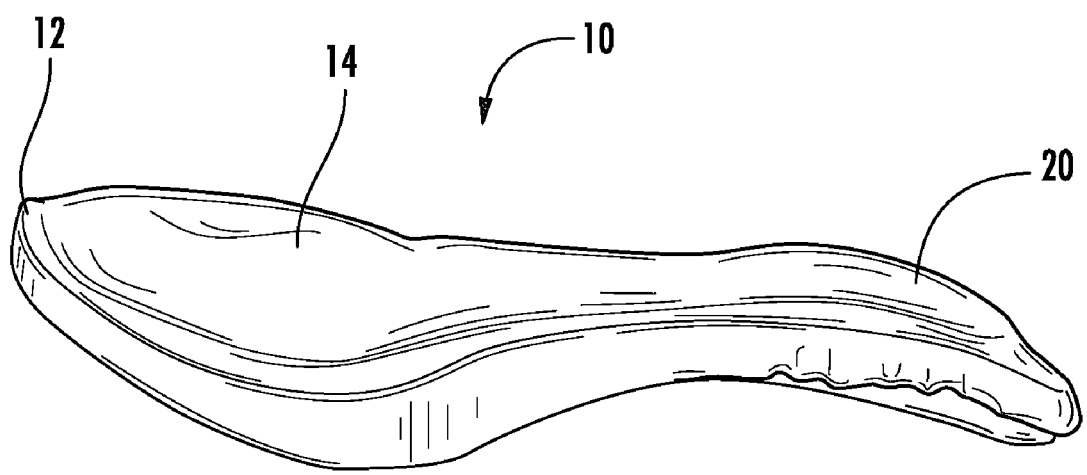
FIG. 4 is a side elevational view of the bicycle seat of FIG. 3.

Referring now to FIG. 3, a top view, and FIG. 4, a side elevational view, the bicycle seat 10 of the present invention is shown to be in an inflated (or partially inflated) condition. As can be seen, the contour profile of the top 24 of the seat 10 has now been effectively changed by the inflation of the bladder 14. In this particular configuration, the bladder 14 is selected to be of a substantially V-shape with two primary lobes 14a and 14b toward the rear of the seat 10. When these lobes 14a and 14b are inflated, they effectively elevate selected portions of the seat 10 to provided target comfort to the rider (not shown). This is in contrast to prior art seats that merely inflate a large cavity in similar fashion to a large air cushion. The present invention maintains the substantial racing performance style seat but also provides targeted cushioning and profile adjusting which does not reduce overall performance of the seat 10. As stated above, the seat 10 is a normal functional riding shape even when uninflated which is when the bladder 14 is flat. The bladder 14 can be provided in different shapes and still be within the scope of the present invention. For example, one includes a connection between the lobes at the front nose. Another, with the lobes separate (unconnected) at the nose, but connected in the rear of the seat. Another, with two distinct lobes, with no major connection. The air flows between small welded channels, or the seat is inflated with two separate pump mechanisms.

FIGS. 3 and 4 also illustrate that it is possible to position of the pump mechanism 20 in any desired location. In FIGS. 3 and 4, the pump 20 is located under the front tip of the seat 10, as can be seen through the transparent layers 12, 14.

Figure 7:
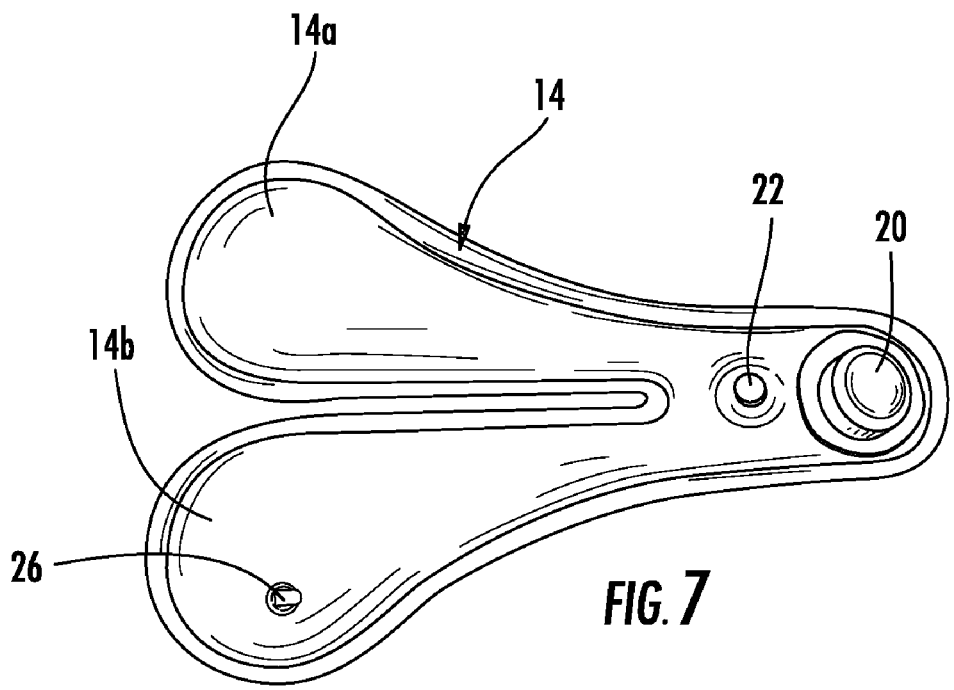
FIG. 7 is a top plan view of the preferred bladder system of the present invention in an uninflated condition with pump and release mechanism at one end of the bladder.
Figure 8:
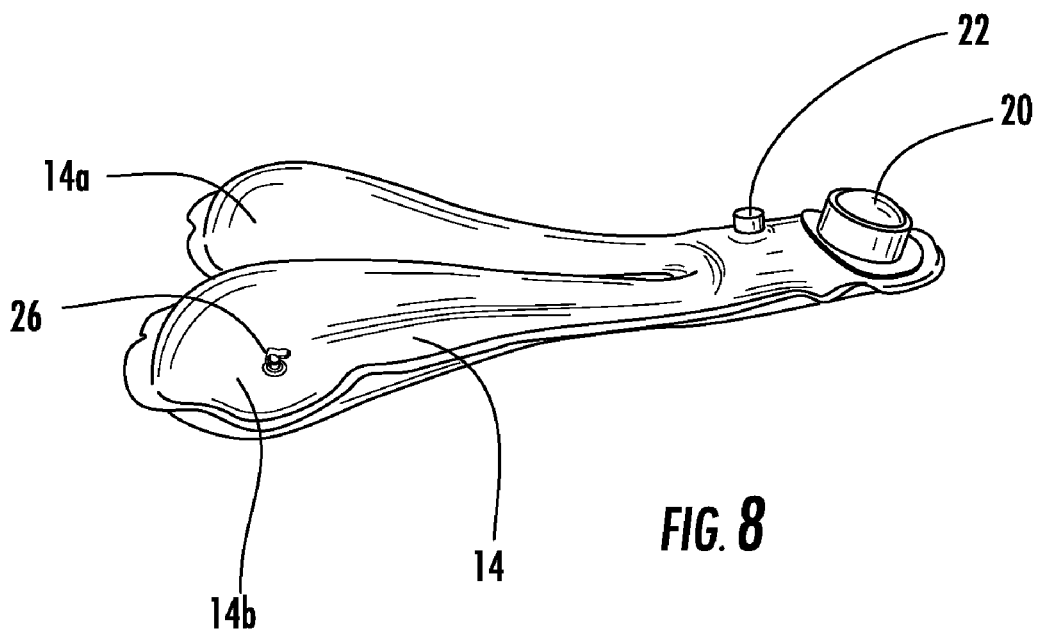
FIG. 8 is a perspective view of the bladder system of FIG. 7 in an inflated condition.
Figure 27:
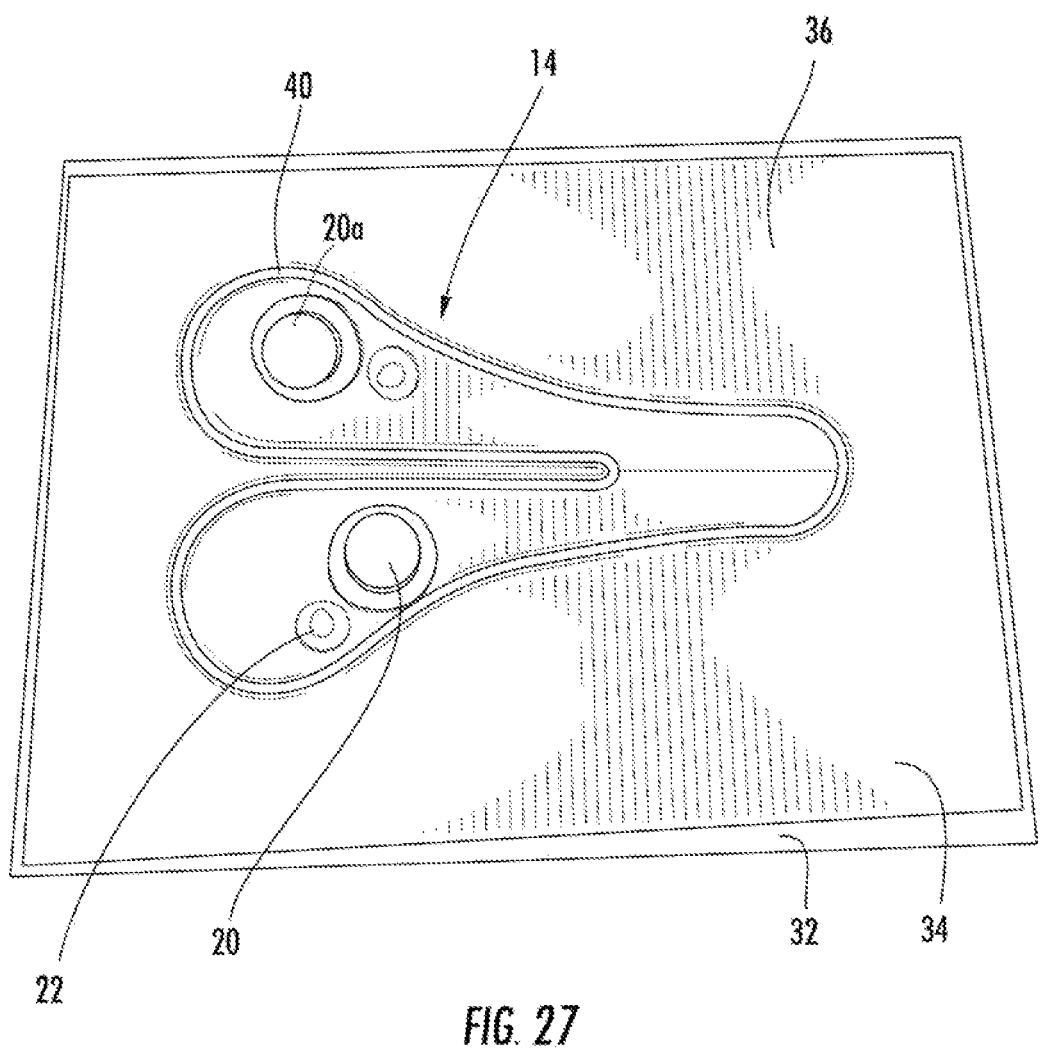
FIG. 27 is a top view of a bladder formed in accordance with the present invention with two pumps, one for each lobe.

Turning now to FIGS. 7-10, an air bladder 14 with integrated pump and valve are shown alone prior to installation into the seat of the present invention. FIG. 7 illustrates one embodiment of the V-shaped configuration in an uninflated condition. As can be understood, the lobes 14a and 14b of bladder 14 on the free end are positioned at the rear of the seat 10 to provide the targeted cushioning required by a rider. FIG. 8 shows the bladder 14 configuration of FIG. 7 in an inflated condition. In this figure, the bladder 14 is inflated substantially to its maximum, however, it should be understood, that any degree of inflation can be provided as desired by the rider to achieve a custom delivery of targeted cushioning and contour profiling. To avoid over inflation of the bladder, an optional bleed off valve 26, as seen in FIGS. 7 and 8 may be provided. It should be noted that with the hand dome pump 20, the bleed off valve is option. Where the bleed off valve 22 is preferably used with when an electric pump 50 is used to inflate by bouncing. In this case, the bleed off valve 22 really sets the seat pressure. The bleed off valve 26 may be tuned to open once a certain pressure inside in the bladder 14 is reached to avoid it from bursting. As seen in FIG. 27, a second pump 20a is fluidly connected to a lobe while pump 20 is fluidly connected to the other lobe.

Figure 9:
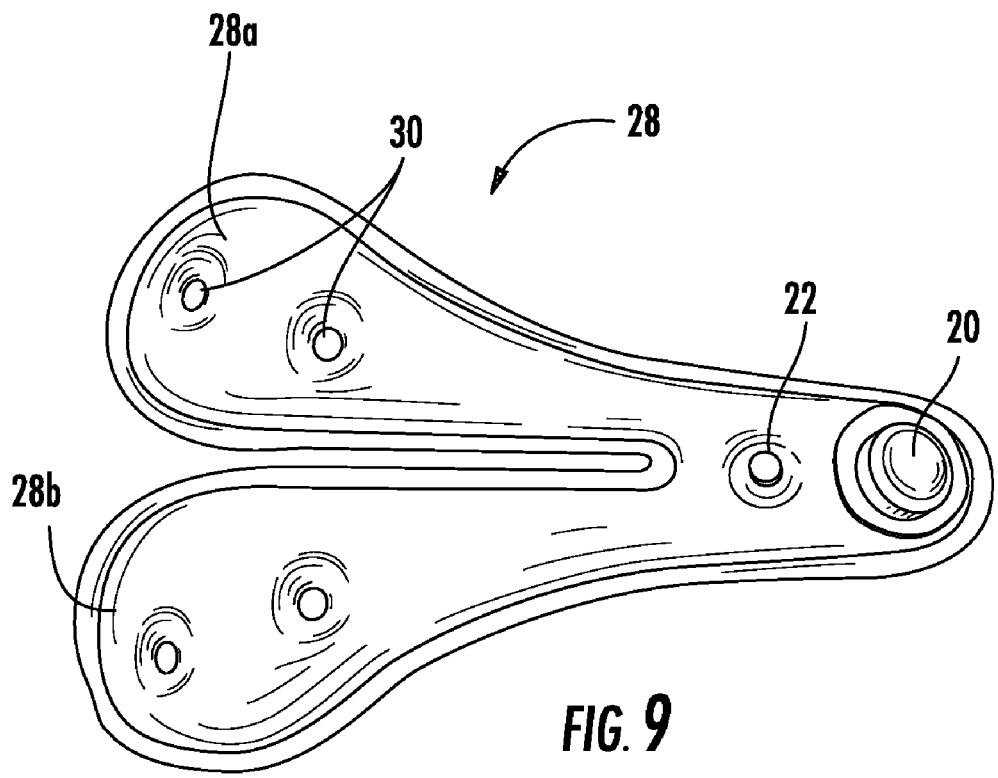
FIG. 9 is a top plan view of an alternative embodiment of the bladder system of the present invention in quilted form in an uninflated condition with pump and release mechanism at one end of the bladder.
Figure 10:
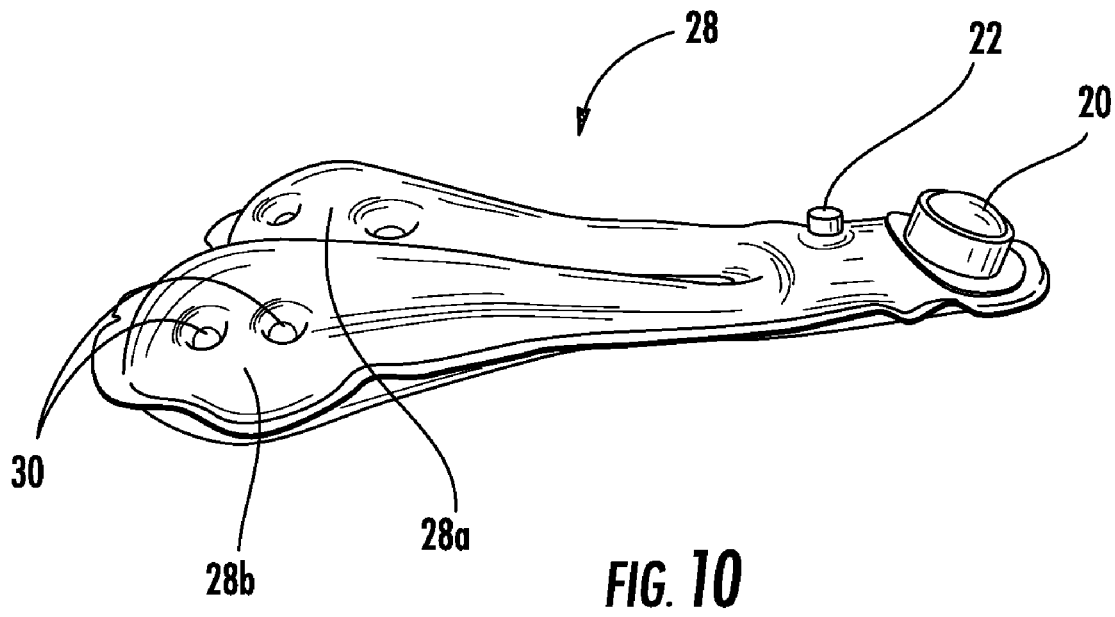
FIG. 10 is a perspective view of the bladder system of FIG. 9 in an inflated condition.

FIGS. 9 and 10 show an alternative embodiment of the V-shaped lobed configuration of the bladder 14 of FIGS. 7 and 8. This embodiment 28 of a bladder includes a quilted configuration where certain portions of the bladder are welded down at 30 to control the height of the bladder 28 in those locations. Further details of this option are discussed below.

The bicycle seat 10 can be formed into many different configurations and still be within the scope of the present invention. More specifically, the bladder 14 (and 28) can be formed in many different ways. It is preferred that the bladder 14 be a flat as possible when in an uninflated condition so the inherent profile of the seat can be enjoyed by the user if additional contouring is not desired. In other words, when the bladder 14 is not inflated, its envisioned that the seat 10 performs similar to a standard bicycle seat. Furthermore, the bladder system described can be added to many existing comfortable seat designs without significantly altering their basic design or comfort when uninflated.

Figure 11:
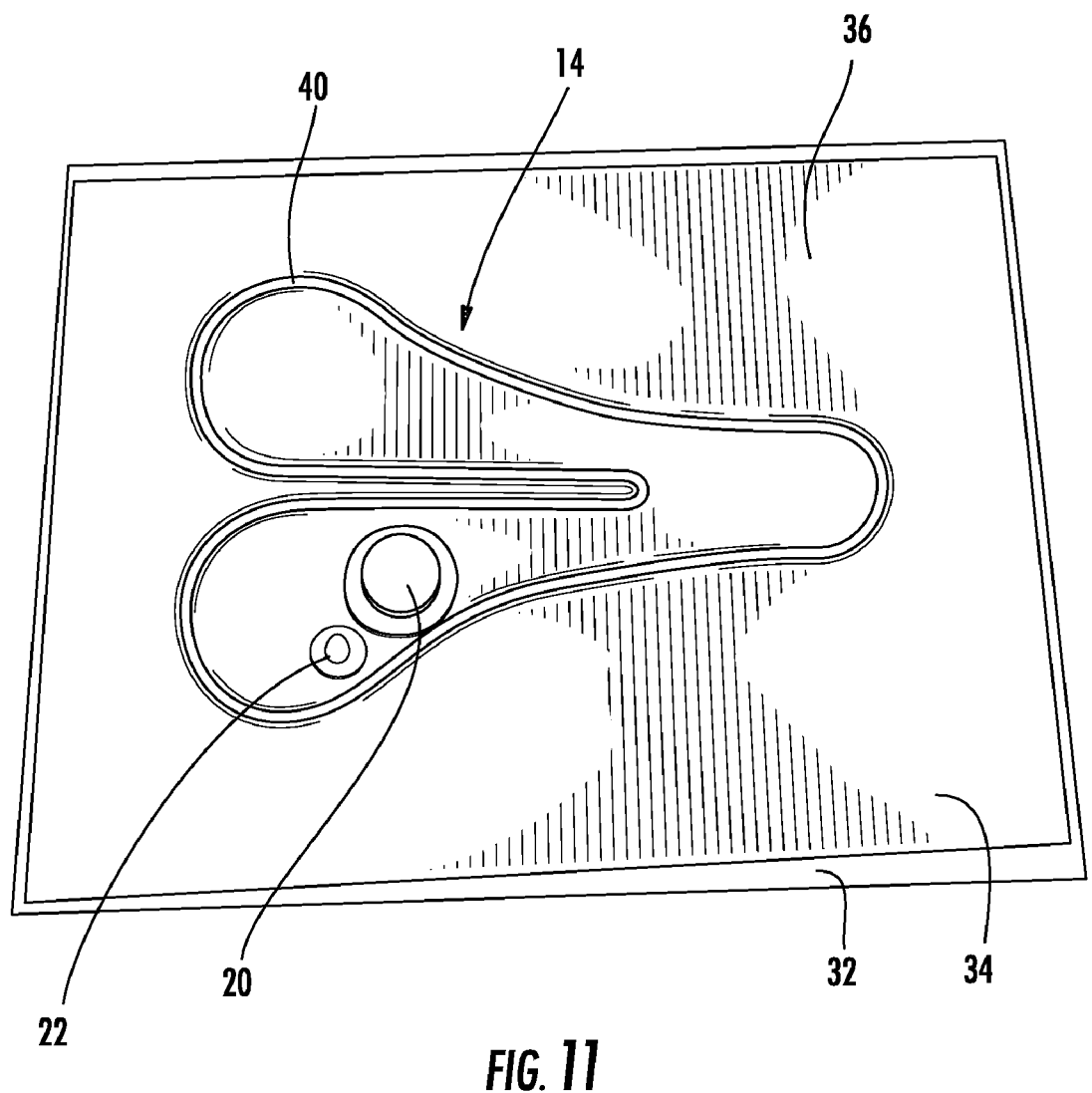
FIG. 11 is a top view of a bladder formed in accordance with the present invention from two sheets of the same film material with the pump and release mechanism in the position shown in FIG. 5.

To achieve the foregoing, it is preferred that two layers of material, such as film are secured together, such as by welding. For example, as in FIG. 11, the films 32 and 34 can be welded at lines 40 into a pattern or shape that allows the seat 10 to change shape in a specific region or many regions when inflated to various pressures. FIG. 11 illustrates this welding of two layers 32, 34 to form the desired configuration prior to trimming the excess material 36. The pump 20 and release valve 22 can be located effectively anywhere within the welded boundary of the bladder. In FIG. 11, the two layers 32, 34 are of the same material, such as stretchable polyurethane film. As a result, when inflated, both sides of the bladder 14 will tend to expand equally.

Figure 12:
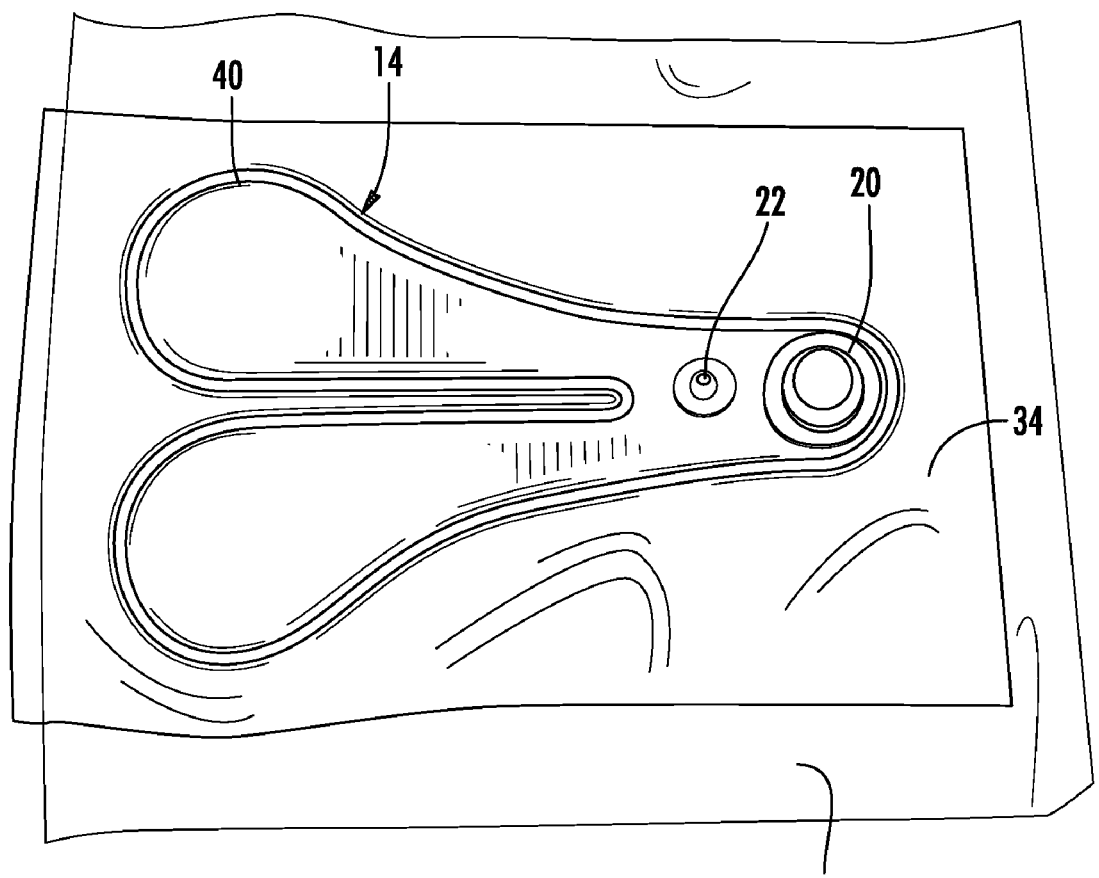
FIG. 12 is a top view of a bladder formed in accordance with the present invention from two sheets of different material with the pump and release mechanism in a different position as shown in FIG. 5.

While it may be desirable to include both films 32, 34 of the bladder 14 as the same material in certain applications and environments, it may also be desirable to provide bladder films 32, 34 of two different types of materials. For example, as shown in FIG. 12, a first film layer 32 that faces upwards when installed can be of a stretchable material while the opposing layer 34 is of a non-stretchable material. Thus, in this case, when the bladder 14 is installed into a seat 10 and then inflated, the bladder 14 will tend to expand in one direction. Preferably, the layer 34 that is closest to the base 12 of the seat 10 is of a non-stretchable type while the opposing layer 32 is stretchable. Thus, during inflation, the bladder 14 will expands upward toward the rider without tending to separate from the base 12.

Figure 14:
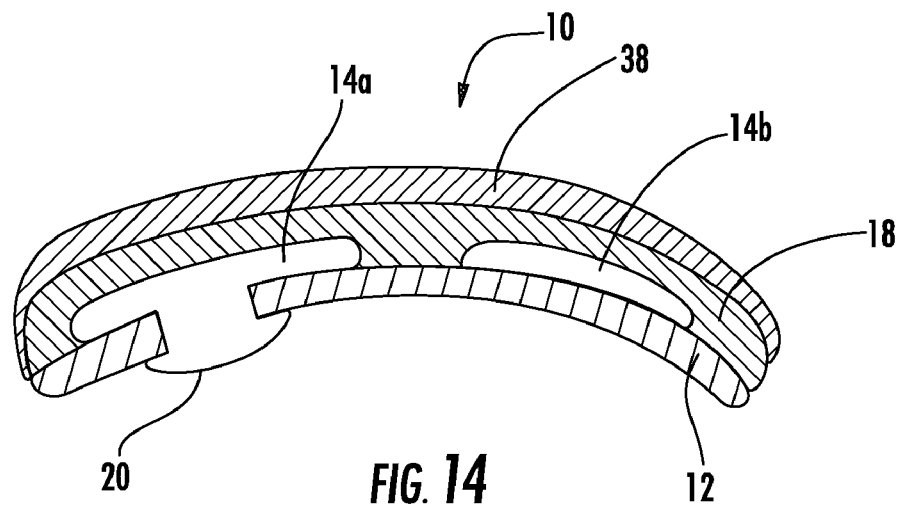
FIG. 14 is a cross-sectional view through the line 14-14 of FIG. 1.
Figure 15:
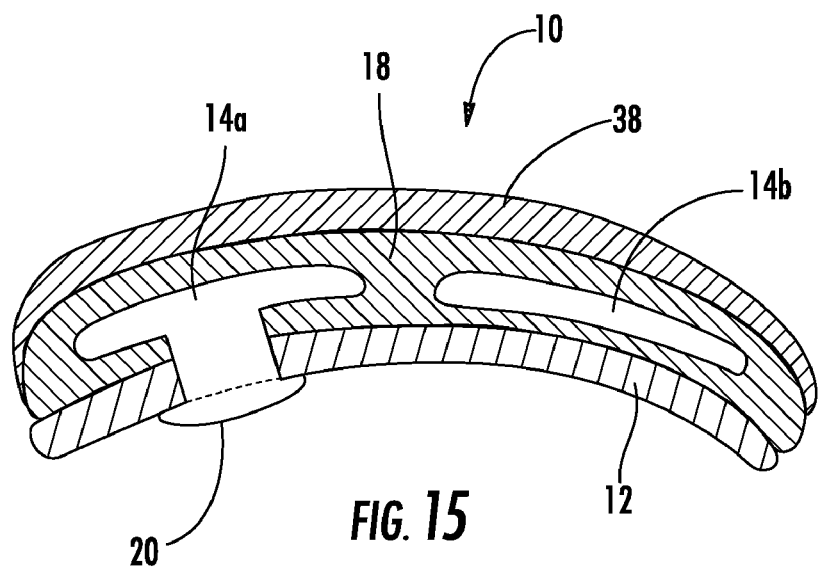
FIG. 15 is a cross-sectional view through the line 14-14 of FIG. 1 but with the bladder encapsulated within a cushioning layer.
Figure 16:
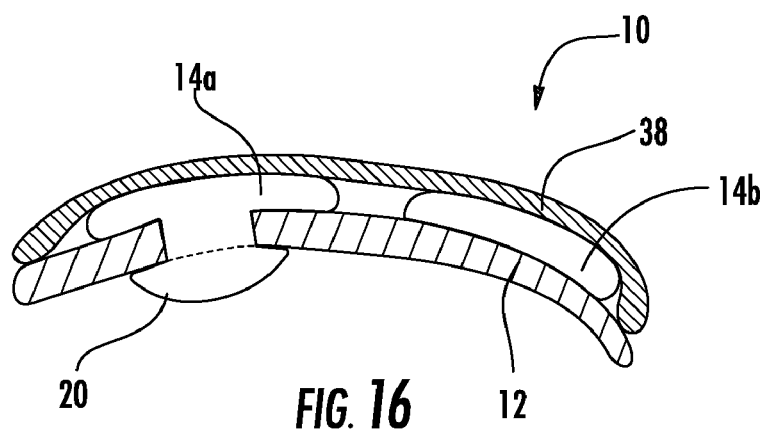
FIG. 16 is a cross-sectional view through the line 14-14 of FIG. 1 but with the bladder directly receiving a finish layer.

In FIGS. 14, 15 and 16, cross-sectional views of different embodiments of the seat 10 of the present invention are shown in detail. As shown in FIG. 14, a cross-sectional view through the line 14-14 of FIG. 1, the bladder 14 is preferably integrated into the seat construction below a top layer of fabric 38 and a layer of cushioning 18, such as gel or other cushioning material. As a result, the bladder 14 is beneath an additional external cushioning layer 18. As in FIG. 15, the bladder 14 can be completely embedded with the cushioning layer 18, such as gel. Thus, in this embodiment, the bladder 14 is fully encapsulated for additional cushioning on all sides. In FIG. 16, the bladder may also be integrated into the seat 10 just below a cover layer 38 of fabric, vinyl or leather (or other suitable material) without a cushioning layer, as in FIGS. 14 and 15. Still further, the bladder 14 can also include a layer 38 laminated film, fabric, or other cover material construction where this laminated bladder 14 itself serves as the top layer of the seat 10 to interface directly with the rider.

As stated above, the bladder 14 can be constructed from any type of fluid-tight containing films 32, 34, such as ones that can contain air, but is preferably made out of relatively soft and durable films. It is also desirable for the films 32, 34 to be dielectrically weldable or heat sealable to be economically fabricated into the appropriate shapes. Thermoplastic polyurethane films are preferred for the bicycle seat 10 of the present invention, but other films materials may be suitable as well. More specifically, the polyurethane films can be polyether or polyester polyurethanes and can be utilized in thicknesses from 1 mil to 20 mil or thicker, but preferable thicknesses are in the range or 3 mil to 10 mil, which provide the good strength without adding unnecessary weight or costs.

The construction of bladder 14 can also be formed in different ways and still be within the scope of the present invention. For example, one method of manufacturing the air bladder 14 is from welded polyurethane films. These are somewhat ideal, in that they are both flexible and strong, and exhibit good cold-crack strength. These materials are also dielectrically weldable. The bladder 14 may of course be made of other materials such as polyolefins and vinyls, block copolyester and Nylon, and other films. The bladder 14 could also be heat sealed or glued instead of dielectrically welded, but the welding 40 does perform very well and allows easy attachment of the weldable pump parts.

More specifically, the inflation height and welding spots 30 and welding lines 40, as in FIGS. 11 and 12, can be optimized to improve performance. In design of the bladder shape, it is important to design for the maximum ultimate height of the inflated bladder 14. If the films 32, 34 are welded together as two flat sheets, then the height of the inflated bladder 14 will relate to the expanse of film between the welded points 30, 40. Thus, a narrow bladder channel will inflate to less height under pressure than a wider area in the bladder 14. It is possible to alter the height of the inflated area by pre-forming the film sheet prior to welding. This is preferably done through vacuum-forming or thermoforming the urethane film into a shape prior to molding, and thus building into the film a greater room to expand when inflated. Rather than allowing for greater inflation height, it is sometimes desirable to limit the inflation height in specific areas of the seat 10. As stated above, the welded bladder 14, with basic flat sheets 32, 34, inflates according to its shape, and wider areas of the bladder 14 will naturally inflate to a higher profile under pressure than narrow bladder areas. The height of the inflated seat 10 in these wider areas of the bladder 14 can be limited by a welding a quilted type pattern into the bladder, as seen in FIGS. 9 and 10. Small spots or dots 30 can be welded between wide expanses to keep the inflated height at a controlled limit. Thus, using the design techniques above, it is possible to create a seat 10 that has a specific molded gel profile when uninflated, and changes to a specific alternative profile when fully inflated.

Figure 17:
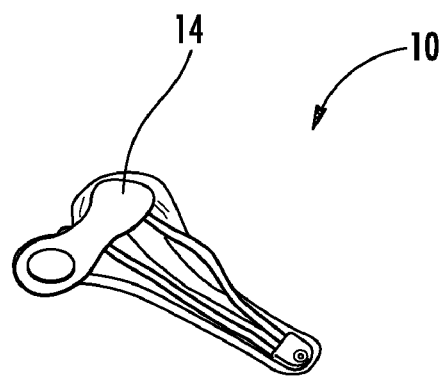
FIG. 17 is a perspective view, with outer cover removed for clarity, of an alternative embodiment of the seat of the present invention.
Figure 18:
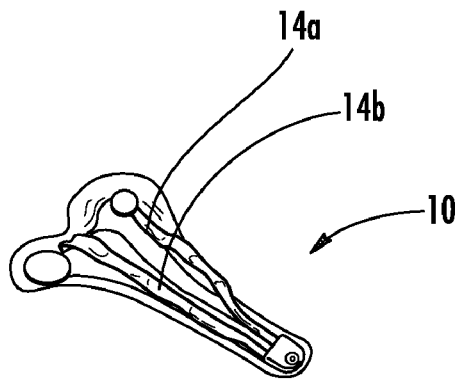
FIG. 18 is a perspective view, with outer cover removed for clarity, of another alternative embodiment of the seat of the present invention.
Figure 19:
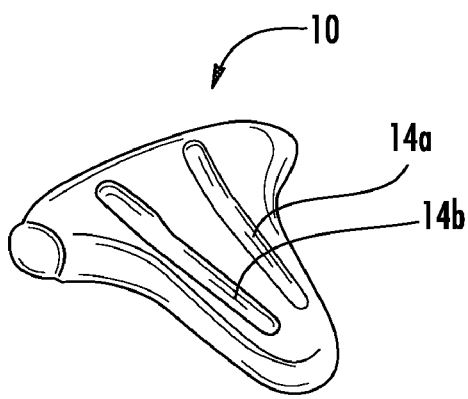
FIG. 19 is a perspective view of the alternative embodiment of FIG. 18 showing contour profiling of the seat in accordance with the present invention.
Figure 20:
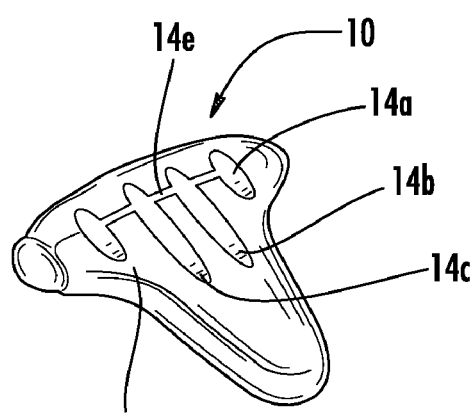
FIG. 20 is a perspective transparent view of an alternative embodiment of the seat of the present invention showing an alternative bladder configuration.
Figure 21:
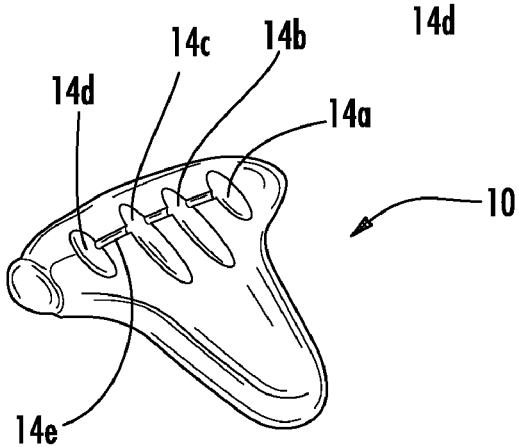
FIG. 21 is a perspective view of the alternative embodiment of FIG. 16 showing contour profiling of the seat in accordance with the present invention.

The bladder design and shape can be provided in many different configurations and still be within the scope of the present invention. One specific novel aspect of the present invention is to utilize the bladder 14 in a shape that when inflated lifts the rider from the seat in selected areas, and thus relieving pressure on the genital area or other sensitive areas of the rider. The configuration can be modified for male and female riders. In order to carry this out, the bladder 14 is made in a contoured shape in the pattern of the areas to be lifted. The V-shaped lobed design, with lobes 14a and 14b, is preferred for this purpose. This bladder 14 is shaped specifically to relieve pressure on the genital area when inflated or to change the contact points between the rider and the seat at various points in the ride. FIGS. 17-21 show additional possible embodiments of the bladder configuration. For example, FIG. 17 shows an embodiment with the bladder 14 across the rear of the seat 10 while FIG. 18 shows two long lobes 14a, 14b that are fluidly connected to one another. FIG. 19 shows the top of a seat 10 that has been inflated using this configuration. The custom contour profiling of the bladder 14 of FIG. 18 can be clearly seen. FIG. 20 shows yet another bladder configuration with a plurality of longitudinal running lobes 14a-d are interconnected with a transverse bladder member 14e. FIG. 21 shows the top of a seat employing the bladder of FIG. 20.

As can be understood due to the integrated pump and release valve, the rider can vary the pressure before or during the ride to maintain comfort. The profile and support of the seat can be significantly changed by varied inflation levels. This shape combined with molded gel, as described below, provides a very unique combination of support and comfort that testers have never before experienced in a seat or gel cover. In accordance with the present invention, air provides support under the preferred cushioning layer of gel to lift the rider so that the genital area is relieved of pressure on the seat. This is very different than and is an advance over the prior art. Thus it is new and novel to integrate an air bladder into a bike seat wherein the shape of the air bladder is designed to provide support and lift to relieve pressure on the rider in other areas by changing the contour of the seat in specific locations. In addition to relieving pressure, the air bladder also provides lightweight support and cushioning for the rider.

Specifically, it has been found that the integration of the bladder with a gel layer or layers, as in FIGS. 14 and 15, provides for both cushioning and stabilization of the bladder. It has been found that stabilizing of the bladder inside of molded gel or in between two layers of gel that is tacky achieves superior results and performance. Using the bladder as the top layer of the seat or just under a top fabric or leather layer, as in FIG. 16, allows for more significant feel of the bladder that some riders may not like, and can also allow for the sensation of movement of the air cavities while riding. Thus, the use of a gel layer is optional. In many cases we it has been found that is thus most desirable to place the bladder in beneath a layer of gel, as in FIG. 14; having the bladder between two gel layers or in the center or a molded gel, as in FIG. 15, also provides further stability for the bladder 14. The preferred gel 18 is a low durometer polyurethane material, but silicone and other gel or gel-like materials can also be used in accordance with the present invention. Because the aforementioned low durometer materials are usually very tacky, it is desirable to cover the gel 18 with a surface treatment appropriate to the end-use, such as fabric, leather, and the like, to serve as a cover 38.

As to more specifics of encapsulating the bladder 14 in gel 18, as in FIG. 15, there are a number of configurations that can be employed. The bladder 14 can placed in a mold and covered in gel. The resulting part will be a bladder 14 encased in gel 18, and can be a flat part (when deflated), or the gel portion can be molded to have an ergonomically pleasing shape, so as to not be flat when the bladder 14 is fully or partially deflated.

The bladder 14 can also be placed between two flat gel sheets. These sheets can have fabrics or films on one side with the other side being tacky, or can have both sides tacky by means of removing a release liner. In either case, the bladder 14 is positioned between the gels, where the tacky sides of the gel are adhered to the bladder 14, and openings in the gel layer allow for the pumping mechanism to protrude. The exposed sides of the gel, if tacky, can be adhered to other materials, such as a top finish fabric or the base of the seat or seat cover, as will be described in detail below. Alternatively, the opposite side of the gel sheet may be designed to be the top or bottom layer of the seat or seat cover.

Still further, either or both of the above mentioned gel sheets, can be molded instead of being of a flat configuration, such as 18 in FIG. 15. In this way, the gel 18 can again have a molded profile that is ergonomically pleasing even when the bladder 14 is fully or partially deflated. It is also possible, that a single layer of gel sheet can be used on the top of the bladder, and the bladder 14 is either adhered by glue to a bottom layer of the seat 10, or the tacky top layer adheres the bladder 14 to the seat 10 through the open spaces around and within the bladder 14.

One or both sides of the bladder 14 itself may be constructed out of a gel sheet 18 that is weldable. In this case the gel 18 is formed with at least one side made with a weldable film layer. This gel sheet 18 may then be molded into the bladder 14 itself so it is possible that bladder itself is made of gel sheet material 18.

Figure 13:
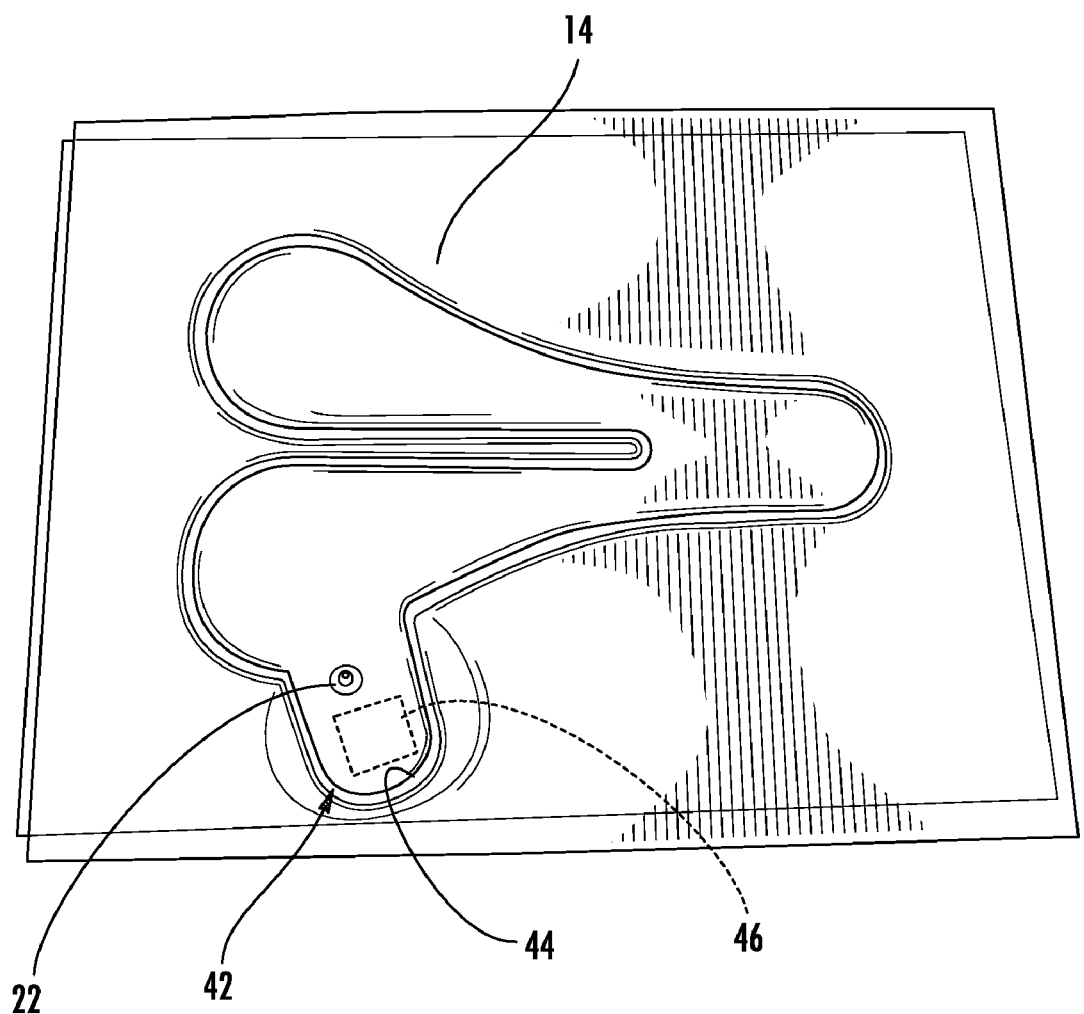
FIG. 13 is a top view of a bladder formed in accordance with the present invention from two sheets of material with the pump and release mechanism located in an integrated side pouch.

As stated above, a dome style pumping mechanism 20 is preferred because it has some advantages over other pumping mechanisms, however, many different types of pumps may be used and still be within the scope of the present invention. For example, non-dome type pumps may be employed. As seen in FIG. 13, an alternative integrated pumping mechanism 42 (also manufactured by Dielectrics) includes of a sealed pouch of film 44 that contains a piece of polyurethane open celled foam 46 at its center. The polyurethane foam 46 acts to spring bias the pouch 44 of film to an open condition to reinflate after pressing by the user. The usual release valve 22 is also preferably provided. This pouch 44 can be made in any appropriate shape and integrated into the air bladder construction. This pumping pouch 44 can be attached as a flap that hangs from the bladder 14 and can be tucked in the seat or underneath by hook and loop fasteners, or the like. Both the pouch 44 and dome pump 20 use a check valve assembly as part of the pumping mechanism. The dome-style pump, as seen in FIG. 6, can also be hung off the side on a flap like the pouch. In both cases the flap is still an integrated part of the bladder and is created while sealing the film sheets. Other similar types of mechanical pumping mechanisms and release valves could be utilized, so long as they are able to be integrated into the seat assembly to allow for one handed inflation and deflation.

It should also be noted that the bladder of FIG. 6, can be affixed directly to the top surface of a seat 10 to effectively retrofit that seat 10 with an inflatable bladder 14. Simply, the bladder 14 may be affixed in any fashion, such as by adhesive, for the example, the peel and stick type. Thus, the bladder will rest on the top of the seat 10 and be secured in place while providing the unique features of the present invention. In such cases, the bladder which is affixed to the top surface of the seat may be encased with gel or further covered in a layer of gel. It may also then be optionally covered in a layer of stretchable top surface material or fabricated skirt.

Figure 22:
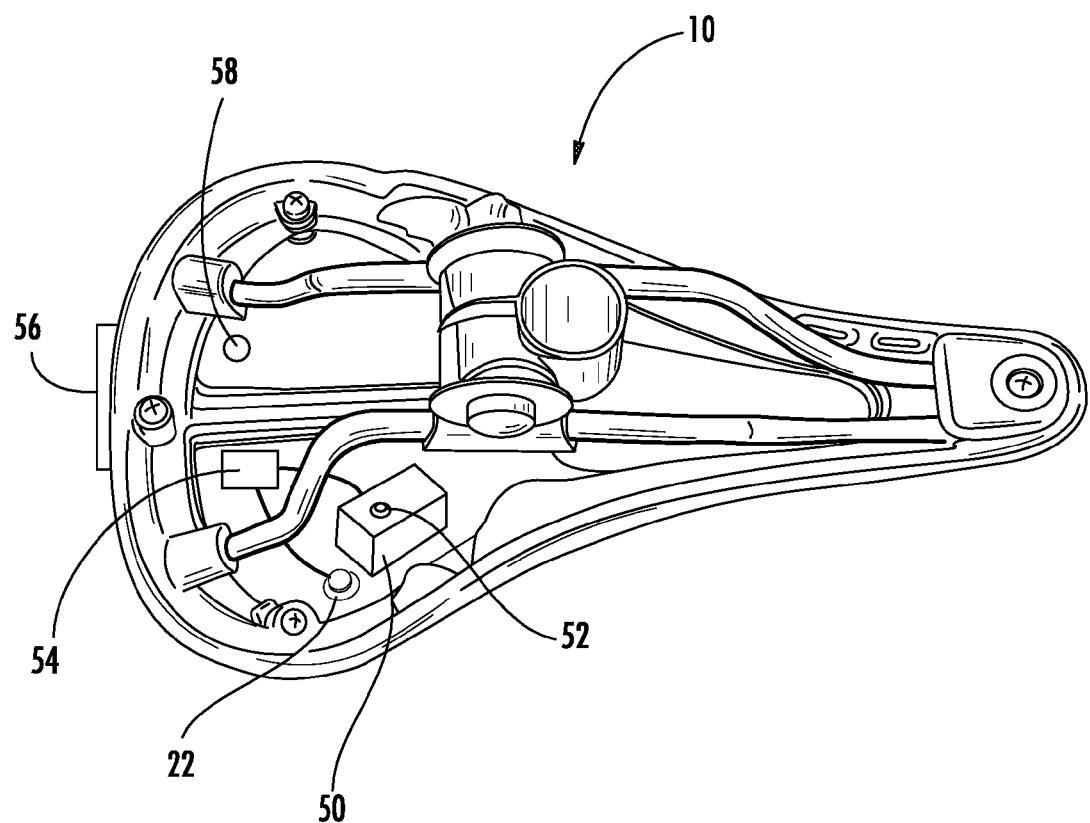
FIG. 22 is a bottom view of a bicycle seat in accordance with the present invention with electronic automatic controllers for inflation and deflation of the bladder.

As an alternative to the integrated mechanical hand pumping mechanism 20 or 42, it is envisioned that an electric pump 50 can be used instead of the dome 20 or pouch type pumps 42 described above. An electric pump 50 is generally shown in FIG. 22 with its associated release valve 22. For example, a small battery operated electric pump 50, such as those used in the wrist blood pressure cuff devices, can be employed. This electric pump 50 can be integrated into the bike seat 10, as in FIG. 22, or a seat cover assembly 100, shown and described below, and still provide the same desirable one handed operation. While FIG. 22, shows the release valve 22 for direct manipulation by the user, the unit can be inflated or deflated by an attached switch 52 strategically located on the seat 10 or seat cover, or by a remote control on the handlebars (not shown) or elsewhere. Thus, inflation and deflation of the bladder 14 may be electronic controlled in this embodiment.

Further, with any automatic inflation device such as the electric pump 50, the seat 10 can be automatically reconfigured during a ride. It is envisioned that with the addition of a simple electronic or mechanical control device 54, as in FIG. 22, is electronically interconnected to the electric pump 50 and release valve 22, which are electrically actuatable. The seat 10 can be set and programmed to dynamically change its inflation during the ride, shifting between several inflation pressures and/or seat shape configurations, or possibly between two separately inflatable bladders. The advantage of this automatically changing dynamic seat is that the bicyclist can remain comfortable without needing to personally adjust the seat. For example, the seat could be timed to relieve pressure points before they became noticeable or painful to the cyclist, as the seat cycles between various shapes and/or pressures to relieve any particular areas of pressure over the long term.

Still referring to FIG. 22, additional pressure control and information can be provided. For example, a seat 10 or cover 100, that incorporates the bladder configuration of the present invention, can have an on-board pressure readout 56, such as in either an analog or digital display. This display may be alternatively located in an easily readable position via wires of wireless connection. This allows the user to select their seat pressure in a repeatable fashion. In addition, with the remote control version, the remote (not shown), which could be attached to the handlebars or any other convenient location, could display a pressure reading. As an alternative to a pressure gauge 56, an inexpensive bleed off pressure valve 58 similar to what is seen on some tire compressors can be employed. In this case, the user can set this attached pressure dial to the desired setting, and then pump the seat 10 up either manually or electronically. Any pressure in excess of the setting is bled off, thus the pressure is established by the setting at which air bleeds off.

Also, an automated mechanical pump can be used. A mechanical pump powered from the up and down bouncing of the rider could also be used in conjunction with the pressure bleed off valve configuration. For example, the dome pump 20 could ride against an impact member to cause this automatic mechanical pumping action. In this case, the rider sets the desired pressure on the bleed off valve 58, and the seat 10 would stay pressured at that level through the pumping action caused by bouncing. A mechanical pump may be attached to the tire movement or pedals could also be used to deliver air to the bladder. In this configuration, the user control inflation and deflation through any of the methods mentioned earlier, such as a switch on the seat 10, a remote control, or a pressure bleed off valve 58.

The unique bladder configuration 14 can also be adapted into a retrofittable cover 100 that can be installed on an existing bicycle seat 102 to provide that existing seat 102 with the unique contour profiling of the present invention. Such a cover 100 is shown in detail in FIGS. 23-26. The bladder is integrated into the add-on cover 100 using substantially the same bladder constructions described above. Details of such internal construction for this cover is not needed because it is the same as the seat discussed in detail above.

Figure 23:
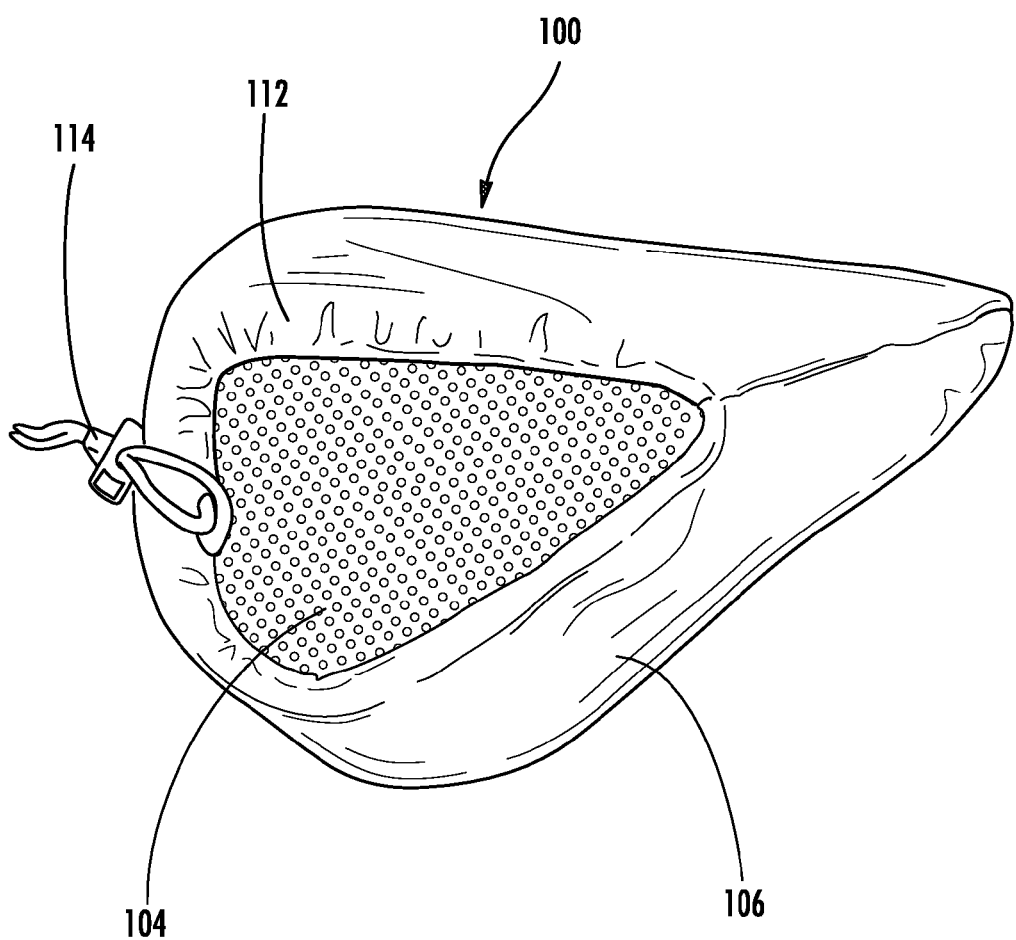
FIG. 23 is a bottom view of the cover for a bicycle seat in accordance with the present invention.
Figure 24:
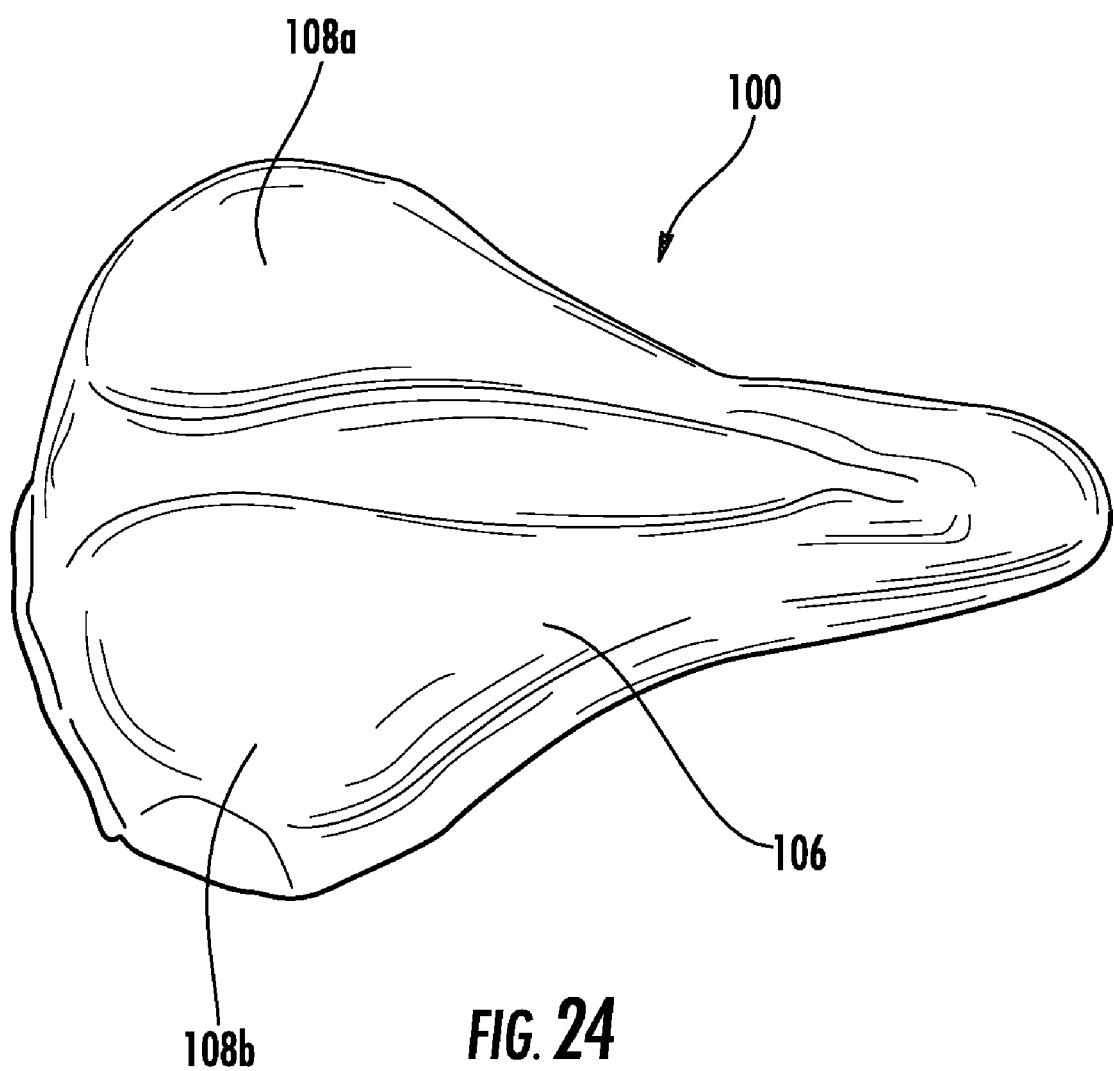
FIG. 24 is a top view of the cover for a bicycle seat of FIG. 23 in an inflated condition.
Figure 25:
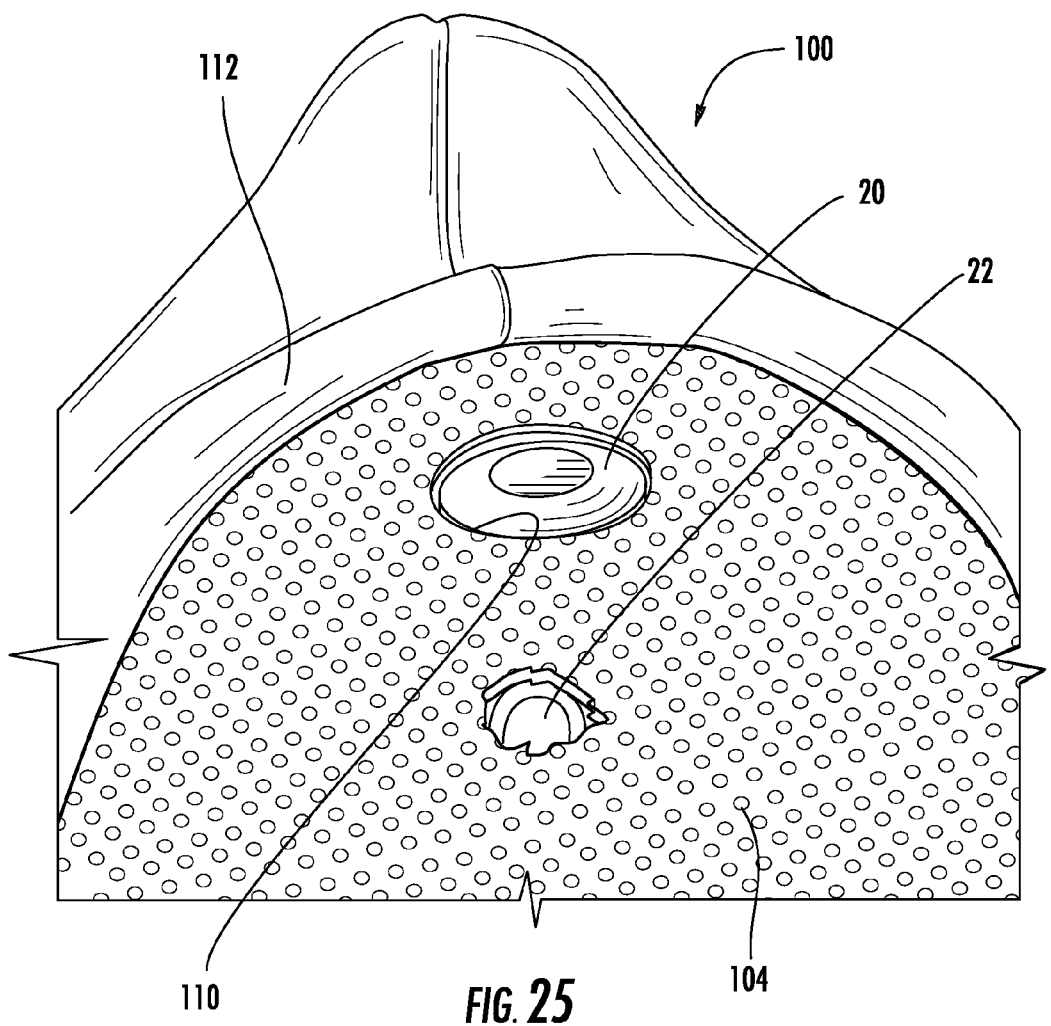
FIG. 25 is a close-up view of the pump and release mechanism of the cover of FIG. 23.
Figure 26:
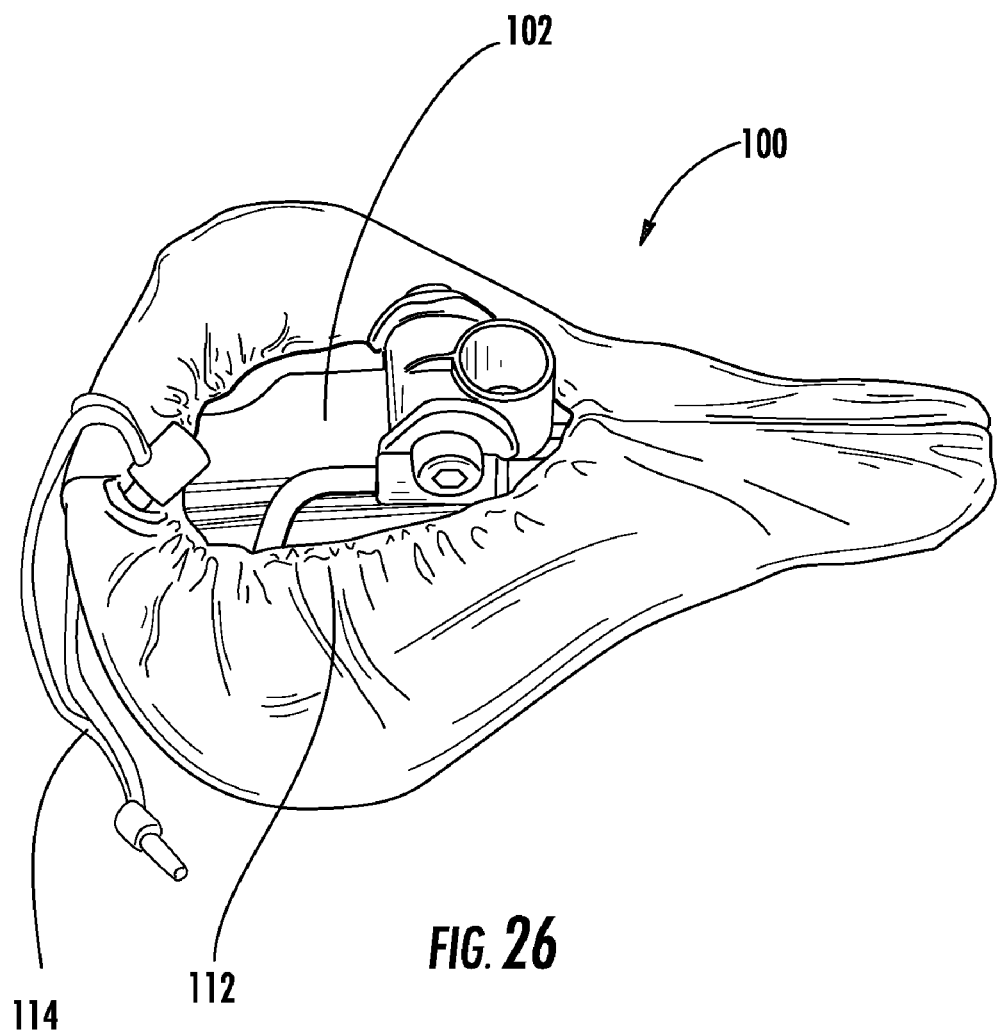
FIG. 26 is a bottom view of the cover for a bicycle seat of FIG. 23 shown retrofitted to an existing bicycle seat.

As part of the cover 100, as in FIG. 23, a relatively rigid fabric layer 104 serves as a base and is adhered to the bottom of the molded gel and bladder structure, as above. An appropriate finish layer 106 is provided on the outside of the cover 100, as best seen in FIG. 24, such as a soft suede-like fabric that is adhered to the top of the molded gel and bladder structure. In FIG. 24, the inflated lobes 108a, 108b can be seen through the top fabric material 106 for contact with the rider. The top and bottom fabrics are stitched around the edges. As seen in FIG. 25, the dome pump 20 and release valve 22 of the encased bladder 14 (not seen) is allowed to extend through a hole 110 in the base side fabric 104. A small fabric skirt 112 is sewn around the edge, as in FIG. 23, and contains a drawstring 114 to secure the skirt 112 to the rider's standard seat 102. FIG. 26, shows a bottom view of the cover 100 secured to an existing seat 102 using the skirt 112 and drawstring 114. It should be noted that other methods to secure the cover 100 to an existing seat 102 can be used.

While the positioning of the pump 20, such as a dome pump, in this particular cover configuration does not allow for adjustment during the ride, it does allow for easy adjustment before the ride and at when the rider stops to rest using the integrated pump 20. The pump 20 can also be placed in a different location if mid-ride adjustments are desired, but this placement does provide for an extremely economical method of making a cover 100, and from a practical standpoint, is desirable because it can be constructed from pre-existing bladders 14 that are used for the standard seat configuration, described above.

The invention is intended to cover all types of configurations, not only ones that allow for mid-ride adjustment. This cover 100 can obviously be made using any of the alternative pumping mechanisms listed above, but specifically might be also made economically using the attached pouch pump 42 construction illustrated in FIG. 13.

In summary, the present invention is unique in integrating air bladder technology into the construction of customizable profiles that allow the cyclist to relieve pressure in selected areas. It is also unique in allowing the user to dynamically customize the profile and firmness of the seat 10 or seat cover 100 before or during the ride. It is also unique in its combination of gel 18 and air bladder 14 together to create a lightweight stabile and comfortable seat 10 or seat cover 100. It is contemplated that any or all of these features may be used together or separately to create a unique seat 10 previously unavailable with any of prior art seat 10 or cover 100 for a seat.

While the specific examples of the invention provided above relate to a bicycle seat 10 or seat cover 100, it is also contemplated that the invention is beneficial in other seat applications where any or all of the features of the invention would be desirable. Such other applications include motorcycle seats, tractor seats, horse saddles, wheelchair seats, office seats, portable or permanent stadium seats, automotive seats, and the like.

It would be appreciated by those skilled in the art that various changes and modifications can be made to the illustrated embodiments without departing from the spirit of the present invention. All such modifications and changes are intended to be within the scope of the present invention.

What is claimed is:

1. A bicycle seat for a rider, comprising:
   a base having a base top surface;
   an inflatable bladder having a bladder top surface; the inflatable bladder being disposed on the base top surface; the base top surface and the bladder top surface together forming a seat contour profile; the inflatable bladder being substantially flat when not inflated while being rideable by a rider;
   a pump connected to the inflatable bladder to introduce fluid media therein; the pump being actuated by motion of a pedal; and
   a release valve fluidly connected to the bladder to permit fluid media to exit therefrom.

2. The bicycle seat of claim 1, wherein the fluid media is air.

3. The bicycle seat of claim 1, wherein the inflatable bladder is disposed on a portion less than all of the base top surface; when the bladder is inflated, the seat contour profile is capable of relieving pressure on selected areas and changing the seat contour profile.

4. The bicycle seat of claim 1, wherein the bladder includes two lobes which are fluidly interconnected to one another by a channel portion; the lobes being longer than they are wide.

5. The bicycle seat of claim 4, wherein the bladder further includes a second pump, the two lobes being respectively fluidly interconnected to the pump and the second pump.

6. The bicycle seat of claim 1, wherein the pump and release valve are integrated into the inflatable bladder and accessible by a rider during use.

7. The bicycle seat of claim 6, wherein fluid media is capable of being introduced and removed from the inflatable bladder during a use.

8. The bicycle seat of claim 6, wherein the pump is a mechanical dome pump.

9. The bicycle seat of claim 6, wherein the pump is an electrical pump.

10. The bicycle seat of claim 6, further comprising:
    an electronic controller electrically interconnected to the electrical pump to automatically control the seat contour profile.

11. The bicycle seat of claim 1, wherein the inflatable bladder includes a first discrete layer of material proximal to a second discrete layer of material with the periphery thereof being rendered fluid-tight to define a chamber therein.

12. The bicycle seat of claim 11, wherein the first discrete layer of material and the second discrete layer of material are dielectrically welded.

13. The bicycle seat of claim 11, wherein the first discrete layer of material and the second discrete layer of material are heat sealed.

14. The bicycle seat of claim 11, wherein the first discrete layer of material and the second discrete layer of material are glued.

15. The bicycle seat of claim 11, further comprising:
    a first extension portion of the first discrete layer of material;
    a second extension portion of the second discrete layer of material;
    a pump residing between the first extension portion and the second extension portion; the pump being in fluid communication with the chamber of the inflatable bladder.

16. The bicycle seat of claim 1, wherein the pump is actuated by motion of a rider.

17. The bicycle seat of claim 1, further comprising:
    a cushioning layer positioned on the base top surface.

18. The bicycle seat of claim 17, wherein the cushioning layer is made of a material selected from the group consisting of gel, polyurethane and silicone.

19. The bicycle seat of claim 17, wherein the inflatable bladder is disposed between the cushioning layer and the base top surface.

20. The bicycle seat of claim 17, wherein the inflatable bladder is encapsulated within the cushioning layer.

21. The bicycle seat of claim 17, wherein the cushioning layer is molded into a three-dimensional shape having a contour profile.

22. The bicycle seat of claim 17, further comprising:
    a finish layer positioned over the cushioning layer.

23. The bicycle seat of claim 1, further comprising:
    a finish layer positioned on the base top surface with inflatable bladder residing therebetween.

24. The bicycle seat of claim 1, further comprising:
    means for remotely controlling the pump.

25. The bicycle seat of claim 1, further comprising:
means for remotely controlling the release valve.
26. The bicycle seat of claim 1, further comprising:
means for displaying pressure of the inflatable bladder.
27. The bicycle seat of claim 1, further comprising:
a pressure bleed off valve fluidly connected to the inflatable bladder.
28. The bicycle seat of claim 1, wherein the bladder is made of a material selected from the group consisting of: polyurethane, polyolefin, vinyl, block copolyester and Nylon.
29. The bicycle seat of claim 1, wherein the inflatable bladder is at least partially manufactured of a gel material.
30. The bicycle seat of claim 1, wherein the base is of a racing-type saddle configuration.
31. The bicycle seat of claim 1, means for securing the bladder directly to an existing seat.
32. A bicycle seat for a rider, comprising:
a base having a base top surface;
an inflatable bladder having a bladder top surface; the inflatable bladder being disposed on the base top surface; the base top surface and the bladder top surface together forming a seat contour profile; the inflatable bladder being substantially flat when not inflated while being rideable by a rider;
a pump connected to the inflatable bladder to introduce fluid media therein; the pump being actuated by motion of wheels on a bicycle; and
a release valve fluidly connected to the bladder to permit fluid media to exit therefrom.
33. The bicycle seat of claim 32, wherein the fluid media is air.
34. The bicycle seat of claim 32, wherein the inflatable bladder is disposed on a portion less than all of the base top surface; when the bladder is inflated, the seat contour profile is capable of relieving pressure on selected areas and changing the seat contour profile.
35. The bicycle seat of claim 32, wherein the bladder includes two lobes which are fluidly interconnected to one another by a channel portion; the lobes being longer than they are wide.
36. The bicycle seat of claim 35, wherein the bladder further includes a second pump, the two lobes being respectively fluidly interconnected to the pump and the second pump.
37. The bicycle seat of claim 32, wherein the pump and release valve are integrated into the inflatable bladder and accessible by a rider during use.
38. The bicycle seat of claim 37, wherein fluid media is capable of being introduced and removed from the inflatable bladder during a use.
39. The bicycle seat of claim 37, wherein the pump is a mechanical dome pump.
40. The bicycle seat of claim 37, wherein the pump is an electrical pump.
41. The bicycle seat of claim 37, further comprising:
an electronic controller electrically interconnected to the electrical pump to automatically control the seat contour profile.
42. The bicycle seat of claim 32, wherein the inflatable bladder includes a first discrete layer of material proximal to a second discrete layer of material with the periphery thereof being rendered fluid-tight to define a chamber therein.
43. The bicycle seat of claim 42, wherein the first discrete layer of material and the second discrete layer of material are dielectrically welded.
44. The bicycle seat of claim 42, wherein the first discrete layer of material and the second discrete layer of material are heat sealed.
45. The bicycle seat of claim 42, wherein the first discrete layer of material and the second discrete layer of material are glued.
46. The bicycle seat of claim 42, further comprising:
a first extension portion of the first discrete layer of material;
a second extension portion of the second discrete layer of material;
a pump residing between the first extension portion and the second extension portion; the pump being in fluid communication with the chamber of the inflatable bladder.
47. The bicycle seat of claim 32, wherein the pump is actuated by motion of a rider.
48. The bicycle seat of claim 32, further comprising:
a cushioning layer positioned on the base top surface.
49. The bicycle seat of claim 48, wherein the cushioning layer is made of a material selected from the group consisting of gel, polyurethane and silicone.
50. The bicycle seat of claim 48, wherein the inflatable bladder is disposed between the cushioning layer and the base top surface.
51. The bicycle seat of claim 48, wherein the inflatable bladder is encapsulated within the cushioning layer.
52. The bicycle seat of claim 48, wherein the cushioning layer is molded into a three-dimensional shape having a contour profile.
53. The bicycle seat of claim 48, further comprising:
a finish layer positioned over the cushioning layer.
54. The bicycle seat of claim 32, further comprising:
a finish layer positioned on the base top surface with inflatable bladder residing therebetween.
55. The bicycle seat of claim 32, further comprising:
means for remotely controlling the pump.
56. The bicycle seat of claim 32, further comprising:
means for remotely controlling the release valve.
57. The bicycle seat of claim 32, further comprising:
means for displaying pressure of the inflatable bladder.
58. The bicycle seat of claim 32, further comprising:
a pressure bleed off valve fluidly connected to the inflatable bladder.
59. The bicycle seat of claim 32, wherein the bladder is made of a material selected from the group consisting of: polyurethane, polyolefin, vinyl, block copolyester and Nylon.
60. The bicycle seat of claim 32, wherein the inflatable bladder is at least partially manufactured of a gel material.
61. The bicycle seat of claim 32, wherein the base is of a racing-type saddle configuration.
62. The bicycle seat of claim 32, means for securing the bladder directly to an existing seat.

* * * * *